Feb. 14, 1961 T. T. BUNCH 2,971,710
APPARATUS FOR CONTINUOUSLY REELING STRAND MATERIAL
Filed May 3, 1957 9 Sheets-Sheet 1

INVENTOR.
T. T. BUNCH
BY A.C. Schwarz, Jr.
ATTORNEY

INVENTOR.
T. T. BUNCH
BY A.C. Schwarz, Jr.
ATTORNEY

Feb. 14, 1961 T. T. BUNCH 2,971,710
APPARATUS FOR CONTINUOUSLY REELING STRAND MATERIAL
Filed May 3, 1957 9 Sheets-Sheet 3

INVENTOR.
T. T. BUNCH
BY A. C. Schwarz, Jr.
ATTORNEY

INVENTOR.
T. T. BUNCH
BY A.C. Schwarz, Jr.
ATTORNEY

INVENTOR.
T. T. BUNCH
BY A.C. Schwarz, Jr.
ATTORNEY

United States Patent Office 2,971,710
Patented Feb. 14, 1961

2,971,710

APPARATUS FOR CONTINUOUSLY REELING STRAND MATERIAL

Tillman Tenney Bunch, near Ashland, Md., assignor to Western Electric Company, Incorporated, New York, N.Y., a corporation of New York Filed May 3, 1957, Ser. No. 656,978

15 Claims. (Cl. 242—25)

This invention relates to apparatus for reeling strand and, more particularly, to means for controlling a reeling or takeup apparatus, for winding strand material on successive reels under desired tension and linear speed, which may continue uninterruptedly as the strand material is being transferred from a full reel to an empty reel.

In the manufacture of plastic insulated wire, the finished insulated wire is directed continuously from an extruder at a substantially constant linear speed in order that the extrusion operation may continue without interruption or disturbance. It is a common practice to employ strand reeling apparatus having two reels where predetermined lengths of finished insulated wire are wound on successive or alternate reels.

When a predetermined length of insulated wire strand has been wound upon a takeup reel, the strand is transferred to an empty reel without interrupting the advancement of the strand and the connecting strand extending between the two reels is automatically severed. The tension in the strand as it is wound upon the takeup reels must remain substantially constant at a predetermined value throughout the operation and, further, it is desirable that the strand be distributed uniformly to lay successive convolutions of the strand side by side throughout the width of the reel drum.

One of the prime objects of this invention is to permit continuous reeling of a strand at substantially constant speed and without imposing injurious stresses or changes of stress upon the strand.

Another object of the present invention is to provide an electrical control system for continuously running takeup apparatus for strand material being delivered to the takeup apparatus from a previous manufacturing operation at a speed determined by the speed at which the strand is being fed through the previous operation.

It is an object of the present invention to provide apparatus wherein reels are controlled during the transfer period in a proper speed relation to each other for permitting transfer of the strand material from a full reel to an empty reel under optimum conditions.

A further object of the present invention is the improvement of reeling apparatus which are provided with means for automatically transferring a strand which is being wound upon a takeup reel which has become filled to an empty reel without stopping the reeling apparatus.

A further object of the present invention is to slow the full reel down for a period during which the strand is transferred from the full reel to an empty reel to provide slack in the strand for implementing the transfer.

A still further object of the present invention is to provide means for controlling reeling apparatus whereby the reeling apparatus can be operated with greater speed and better efficiency.

Strand reeling apparatus, which illustrate certain features of this invention, may include a plurality of reels driven rotatably by appropriate drive units, strand distributing means mounted for movement transversely of the winding surface, means for indexing the strand distributing means from one takeup reel to a succeeding takeup reel, means connected operatively to each of the reels for gripping portions of the strand adjacent to each reel when the strand is transferred from one reel to another and means for disconnecting the power from the drive unit associated with the filled reel from which the strand is to be transferred and allowing the reel to coast, and, as a result of the inherent friction in said drive unit, thereby accumulate slack necessary for the transfer of the strand from the filled reel to an empty reel without introducing excessive stresses in the strand when the strand is indexed from the filled reel and directed to the empty reel by the distributing means.

Other objects and features of the invention will be more readily understood from the following detailed description, when read in conjunction with the accompanying drawings, in which:

Fig. 5 is an alternate embodiment of a portion of the takeup apparatus embodying the invention;

It should be understood in the following description of the invention that the relays, unless otherwise described, operate to move all contacts upwardly from their normal position, as shown in Figs. 7 to 11, inclusive.

Figure 1:
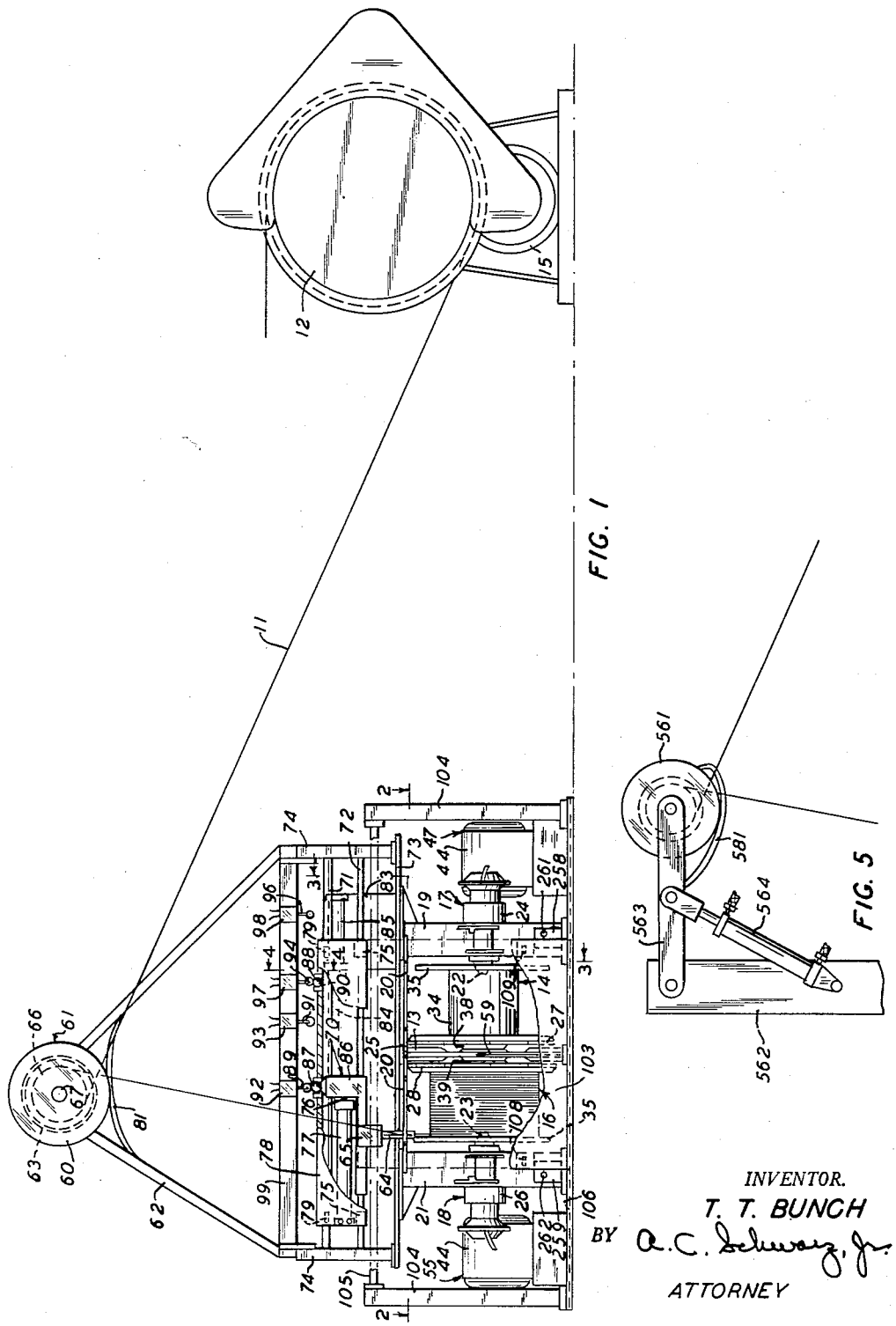
Fig. 1 is a fragmental front elevation of a takeup apparatus embodying the invention.
Figure 2:
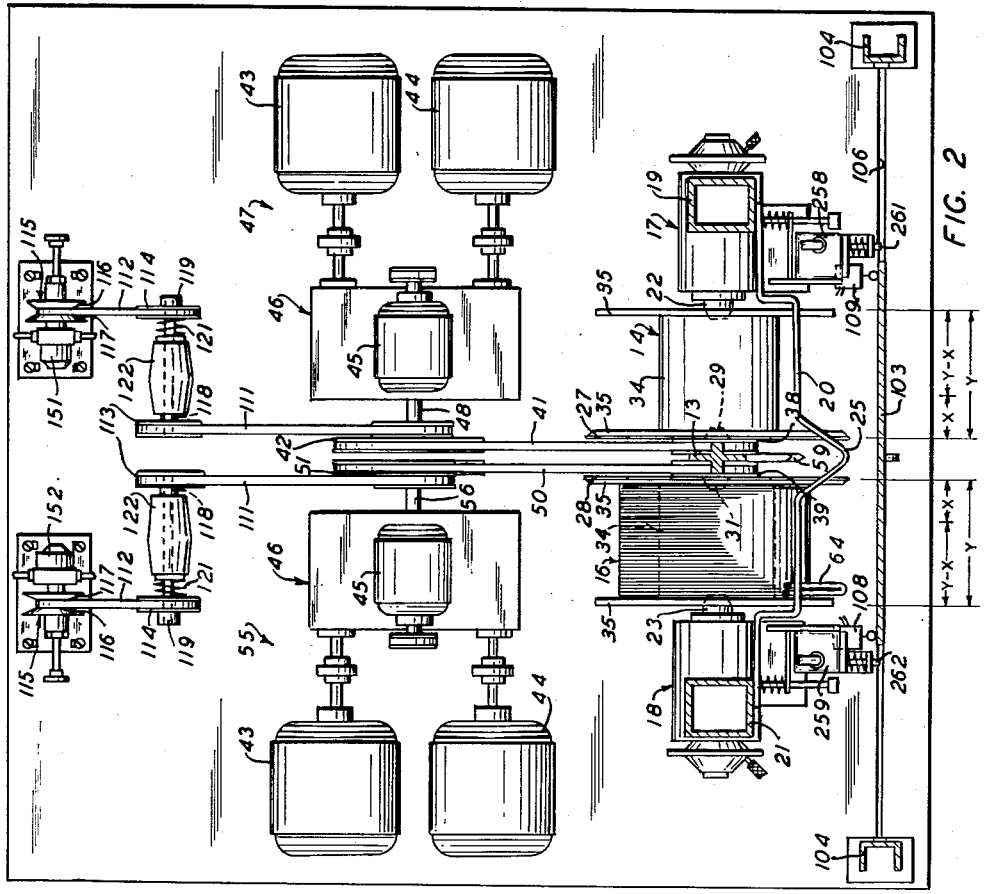
Fig. 2 is an enlarged, fragmental view of a portion of the takeup apparatus taken along line 2—2 of Fig. 1.
Figures 3, 4:
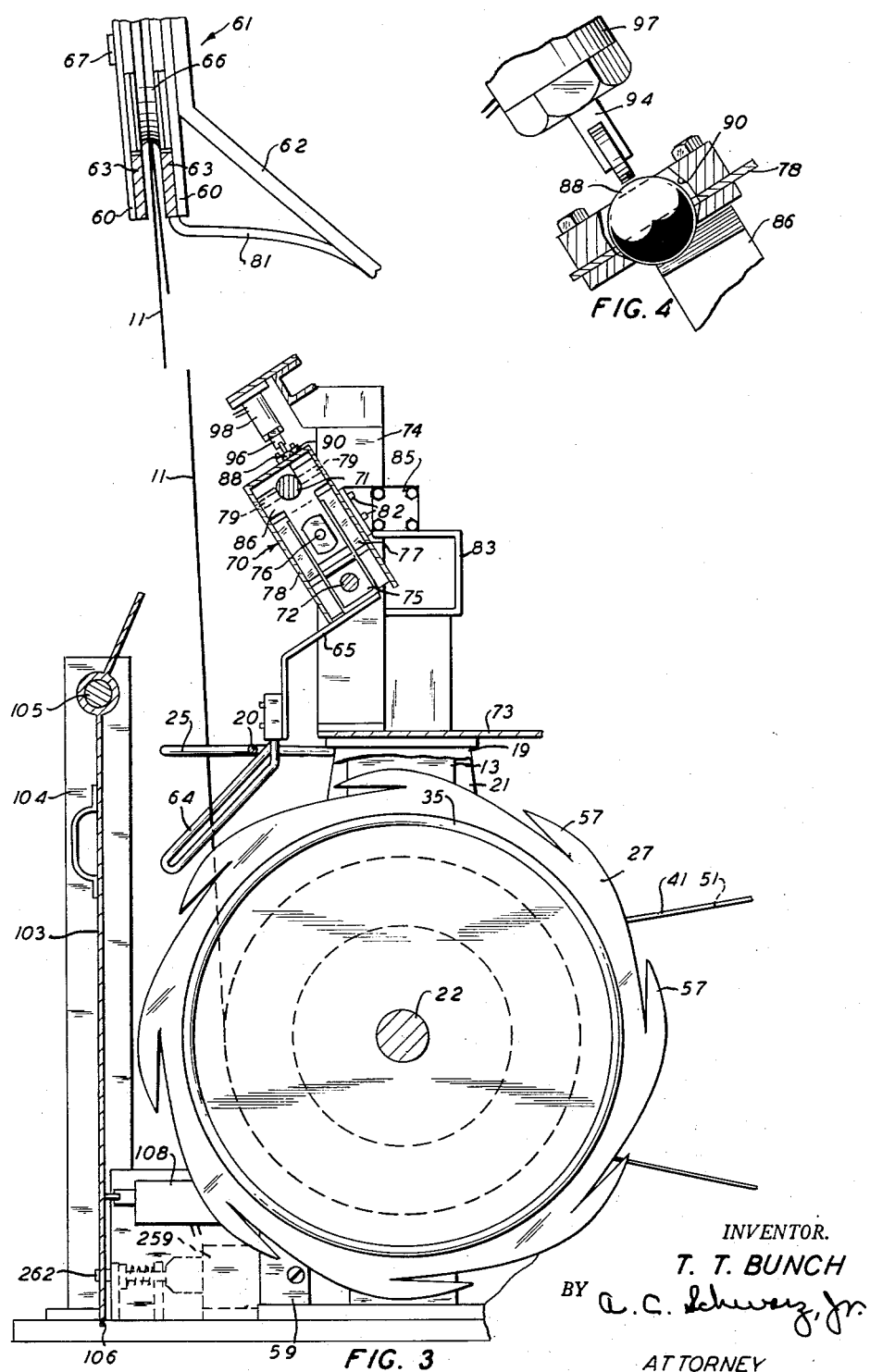
Fig. 3 is an enlarged, fragmental view of a portion of the takeup apparatus taken along line 3—3 of Fig. 1.
Fig. 4 is an enlarged, fragmental view of a portion of the distributor control means of the takeup apparatus taken along line 4—4 of Fig. 1.

Referring now to the drawings, wherein like numerals designate the same or similar elements throughout the several views, there is shown in Figs. 1, 2 and 3 strand reeling apparatus for taking up a strand 11 without interruption. The strand 11 may be, for example, an insulated wire, delivered at a substantially constant rate from an insulating machine (not shown) by a conventional strand-advancing capstan 12 driven by a motor 15 or other appropriate means.

The strand reeling apparatus comprises a flat, rigid, support member 13 located centrally between a right reel, designated generally by the numeral 14, and a left reel, designated generally by the numeral 16. The reels 14 and 16 are positioned side by side and are axially aligned, but could be positioned otherwise. The reels 14 and 16 are urged toward the support member 13 by pneumatic piston-cylinder assemblies, designated generally by the numerals 17 and 18, which are secured in rigid support members 19 and 21, respectively, on opposing sides thereof, through the pins or live centers 22 and 23 of tail stocks 24 and 26, respectively, which support the reels 14 and 16, respectively. The reels 14 and 16 which are actuated by the assemblies 17 and 18, respectively, are also urged against conventional snagger members 27 or 28, respectively, rotatably secured to the rigid support member 13.

The takeup reels 14 and 16 are identical in construction and are positioned side by side as shown in Fig. 1 for axial rotation about a common normally-rotational axis. The takeup reels 14 and 16 are of a conventional design and each includes a cylindrical winding drum 34 and a pair of flange-like reel heads 35—35 secured fixedly at opposite ends of the winding drum 34.

The reels 14 and 16 are positioned fixedly to the associated snagger members 27 and 28, respectively, for rotation therewith by means of an axial projection or live center 29 and 31, respectively, of head stocks (Fig. 2) and eccentric dog projections (not shown). The axial projections or centers 29 and 31 of the head stocks are utilized to cooperate with the pins or centers 22 and 23 of the tail stocks 24 and 26 to support opposing sides of the reels 14 and 16, respectively. The eccentric dog projections engage eccentrically positioned apertures (not shown) in heads 35—35 of the reels 14 and 16 and are used for transmitting torque to the reels 14 and 16 from the snagger members 27 and 28.

An elongated guide member 20 is provided with a camming surface 25 which serves to hold the strand 11 out from between the reels 14 and 16 during the cutover operation. The opposing ends of the guide member 20 are secured to the support members 19 and 21 to hold the guide member 20 in a predetermined position.

The reel-supporting centers 29 and 31 are connected operatively to pulleys 38 and 39, respectively, for rotation therewith. The pulley 38 is connected by means of an endless belt 41 to a drive pulley 42 which is driven rotatably by an electric motor drive unit, designated generally by the numeral 47, through an output shaft 48. Similarly, the pulley 39 is connected by means of an endless belt 50 to a drive pulley 51 driven by an electric motor drive unit, designated generally by the numeral 55, through an output shaft 56.

The drive units 47 and 55, known as "Specon" drive units, are identical in construction except that they are driven in opposite directions.

The "Specon" drive units 47 and 55 are supplied by the Speed Control Division of the Fairchild Engine and Airplane Corporation, St. Augustine, Florida, and each comprise two direct-current machines 43 and 44 connected operatively to each other and to an alternating current motor 45 through a plurality of gears and shafts (not shown) in a transmission designated generally by the numeral 46. The transmission 46 of the Specon drive units 47 or 55 determines the primary characteristics of the drive unit 47 or 55.

One of the characteristics of the "Specon" is associated with the speed relationship of the direct-current machines 43 and 44 and the output shaft 48 or 56, since the ratio of the speeds of the direct-current machines 43 and 44 determines the speed of the output shaft 48 or 56. Under one kind of operation, the speed of the output shaft 48 or 56 of the drive units 47 and 55 may have a predetermined controlled speed that can be adjusted by varying the setting on a potentiometer 49 (Fig. 7) connected to the shunt field of the direct-current machine 43 to vary the current therein while the current in the shunt field of the direct-current machine 44 is kept constant. The speed of the drive unit 47 or 55 is therefore constant, since the shunt field current ratio of the direct-current machines 43 and 44 determines the speed ratio and thus the no load speed of the output shaft 48 or 56 of the drive unit 47 or 55.

Under another kind of operation, the tension in the strand 11 attached to the reels 14 or 16 driven by the unit 47 or 55 may be controlled by the inherent characteristics of the machines 43 and 44 and the motor 45 of the unit 47 or 55 in such a manner that a substantially constant predetermined tension is maintained on the strand 11 as it is wound upon the respective takeup reels 14 or 16.

The "Specon" drive units 47 and 55 are used in conjunction with relay circuits so that the specific operation of the drive units 47 and 55 will be repeated by the operation of the associated relay circuit. The control of the machines 43 and 44 and the motor 45 and thus the drive units 47 and 55 are automatic once the drive units 47 and 55 have been adjusted by the operator to suit the characteristics of the strand 11 and the production speed desired.

The machines 43 and 44 of the unit 47 or 55 associated with the idle reel 14 or 16 are always run on shunt fields and the machine 43 of the unit 47 or 55 associated with the working reel 14 or 16 is always run on series field and the machine 44 associated with the working reel 14 or 16 is run on a shunt field and a differentially diverted series field, but during the start tension period when the unit 47 or 55 is running and the capstan 12 is stopped or running at a low speed, some shunt field is superimposed on the series field of machine 43 as a result of closed, normally-open contacts 52 or 53 associated with a relay 54 in a speed indicating device, designated generally by the numeral 58 (Fig. 8), in which the relay 54 is energized when the capstan 12 is stopped or running below a predetermined speed. The speed indicating device 58 is energized by bus bars 68 and 69 from the secondary of a transformer 80.

Suitable electrical control means are provided for stopping, starting and controlling the machines 43 and 44 and the motor 45 of the drive units 47 and 55 independently, as will be explained hereinbelow.

Mounted between the central support member 13 and the adjacent reel heads 35—35 of the takeup reels 14 and 16, respectively, are the snagger wheels 27 and 28. The snagger wheel 27 rotates with the reel-supporting center 29 and, similarly, the snagger wheel 28 rotates with the reel-supporting center 31. Each of the snagger wheels 27 and 28 is provided with a series of peripheral, tangentially-projecting fingers 57—57 (Fig. 3), which function to catch the strand 11 when the latter is transferred from one takeup reel 14 or 16 to the other takeup reel 14 or 16 during a cutover operation. A stationary, vertically positioned cutter 59 is mounted on the front surface of the central support member 13 and is designed to sever the strand 11 when a portion thereof is engaged between the fingers 57—57 on the snagger wheels 27 and 28, and swung thereby during the cutover operation.

Strand engaging and severing devices employing snagger wheels, similar to those described hereinabove, are disclosed in the Hauck et al. Patent 2,779,545, issued on January 29, 1957.

The strand 11, as it advances toward the takeup reels 14 or 16, advances from the capstan 12 around a freely rotatable guide sheave, designated generally by the numeral 61, positioned on the top of an inverted, V-shaped frame 62 near the center of the takeup apparatus with the righthand side thereof tangent to the longitudinal axis of the center support member 13. The guide sheave 61 comprises two stationary, spaced, circular plate members 60—60 (Fig. 3), which have inwardly projecting annular members 63—63 which shroud the edges of a conventional sheave 66 mounted rotatably on a stationary pin 67. The annular members 63—63 prevent the strand 11 from riding down between the plates 60—60 and the sheave 66 on either side thereof. An elongated guide 81 is provided on the righthand side of the sheave 61, as viewed in Fig. 3, to cooperate with the portion of the strand 11 extending from the sheave 61 to a distributor 70 to guide the portion of the strand 11 extending from the sheave 61 to the capstan 12 back between the plates 60—60 when the strand 11 becomes slack during a cutover.

From the guide sheave 61 the strand 11 is directed downwardly into a slot of a forwardly projecting slotted guide 64 mounted at the lower end of a depending distributor arm 65. The guide 64 directs the strand 11 to one or the other of the takeup reels 14 and 16.

The distributor arm 65 forms a portion of a movable distributor carriage, indicated generally by the numeral 70, which is mounted slidably for transverse movement along a pair of horizontally extending, spaced traverse rods 71 and 72. The traverse rods 71 and 72 are supported fixedly at their opposite ends by upright support members 74—74 on a plate member 73 supported on the supports 13, 19 and 21. The distributor carriage 70 is supported slidably on the traverse rod 72 by means of bearing blocks 75—75 which are secured fixedly to the distributor carriage and slidably to the traverse rod 72. The carriage 70 is secured fixedly to a piston rod 76 of an indexing cylinder 77. The indexing cylinder 77 is secured rigidly to an inverted, U-shaped hood member 78 which in turn is secured slidably to the traverse rod 72 by the bearing blocks 75—75 and secured slidably to the traverse rod 71 by bearing members 79—79 secured at opposing ends of the hood 78 and opposing sides of the rod 71.

Referring again to Figs. 1 and 3, the distributor carriage 70 is shown connected operably to the outer, free end of a movable piston rod 84 of a hydraulically actuated distributor cylinder 85 which is actuatable to reciprocate the distributor carriage 70 transversely with respect to the takeup reels 14 and 16 alternately so as to distribute the strand 11 across the winding drums 34—34 of the takeup reels. The free end of the rod 84 is secured rigidly to the righthand end of the cylinder 77 as viewed in Fig. 1 by cap screws 82 through apertures in the hood member 78. The opposing end of the cylinder 77 is secured to the hood member 78 by appropriate means. The distributor cylinder 85 is secured rigidly to the plate member 73 by means of a support member, designated generally by the numeral 83, and the rod 84 thereof is secured to the hood member 78 and cylinder 77 so as to reciprocate the cylinder 77 and the hood 78 and thus the carriage 70 which is secured fixedly to the outer, free end of a movable piston rod 76 of the pneumatically-actuated stepping or indexing cylinder 77 designed to index the distributor carriage 70 alternately from a lefthand operating position to a righthand operating position and vice versa.

The distributor carriage 70 is shown in Fig. 1 in its lefthand operating position, in which operating position it operates to distribute the continuously advancing strand 11 upon the takeup reel 16.

The distributor carriage 70 is provided with a cam member 86 which is designed to actuate alternately ball members 87 and 88 which are secured for limited movement in apertures 90—90 in the hood 78. The distributor carriage 70 carries the cam 86, designed to move the ball member 87 or 88 so it extends above the surface of the hood 78 a sufficient amount, in turn, to actuate alternately spring-biased plungers 89 and 91 or 94 and 96 of sensitive limit switches 92 and 93 or 97 and 98, respectively. When the piston rod 76 of the indexing cylinder 77 is fully retracted to the left, as viewed in Fig. 1, the cam 86 is in engagement with the ball 87 to operate the limit switches 92 and 93. Conversely, if the piston rod 76 of the indexing cylinder 77 were fully extended to the right, as viewed in Fig. 1, the cam 86 would be in engagement with the ball 88 to operate the limit switches 97 and 98.

Figure 8:
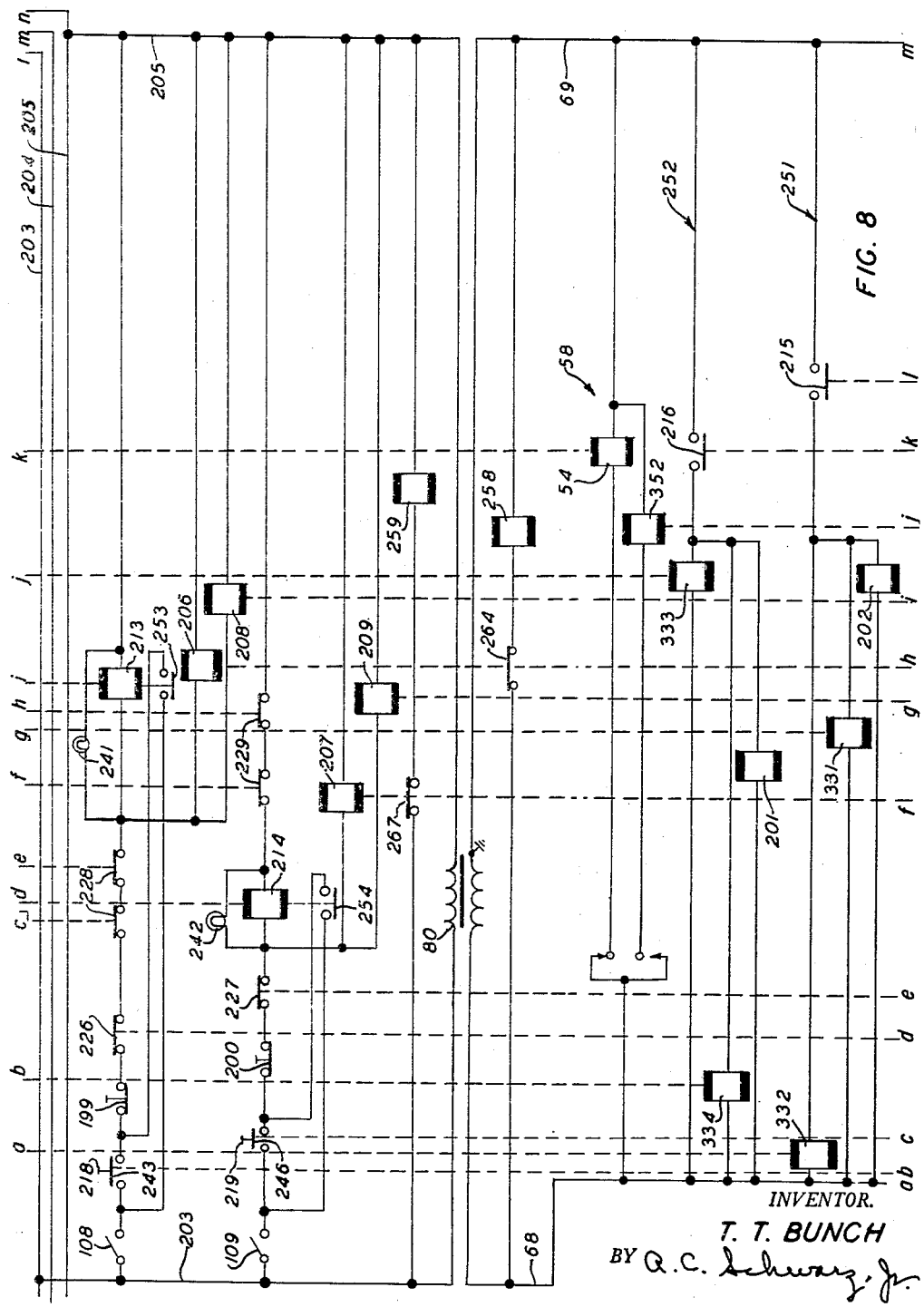
Figure 9:
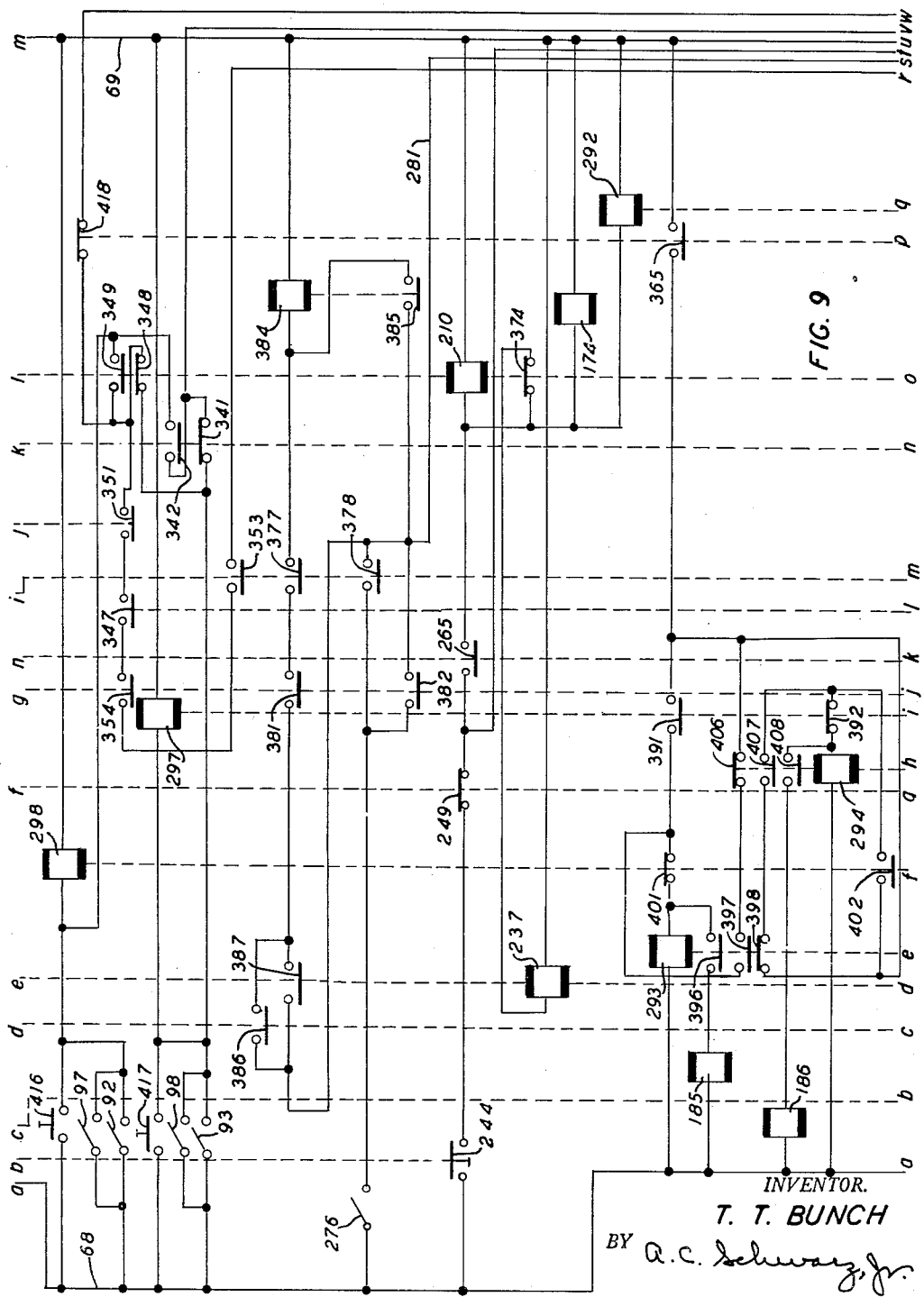
Figure 10:
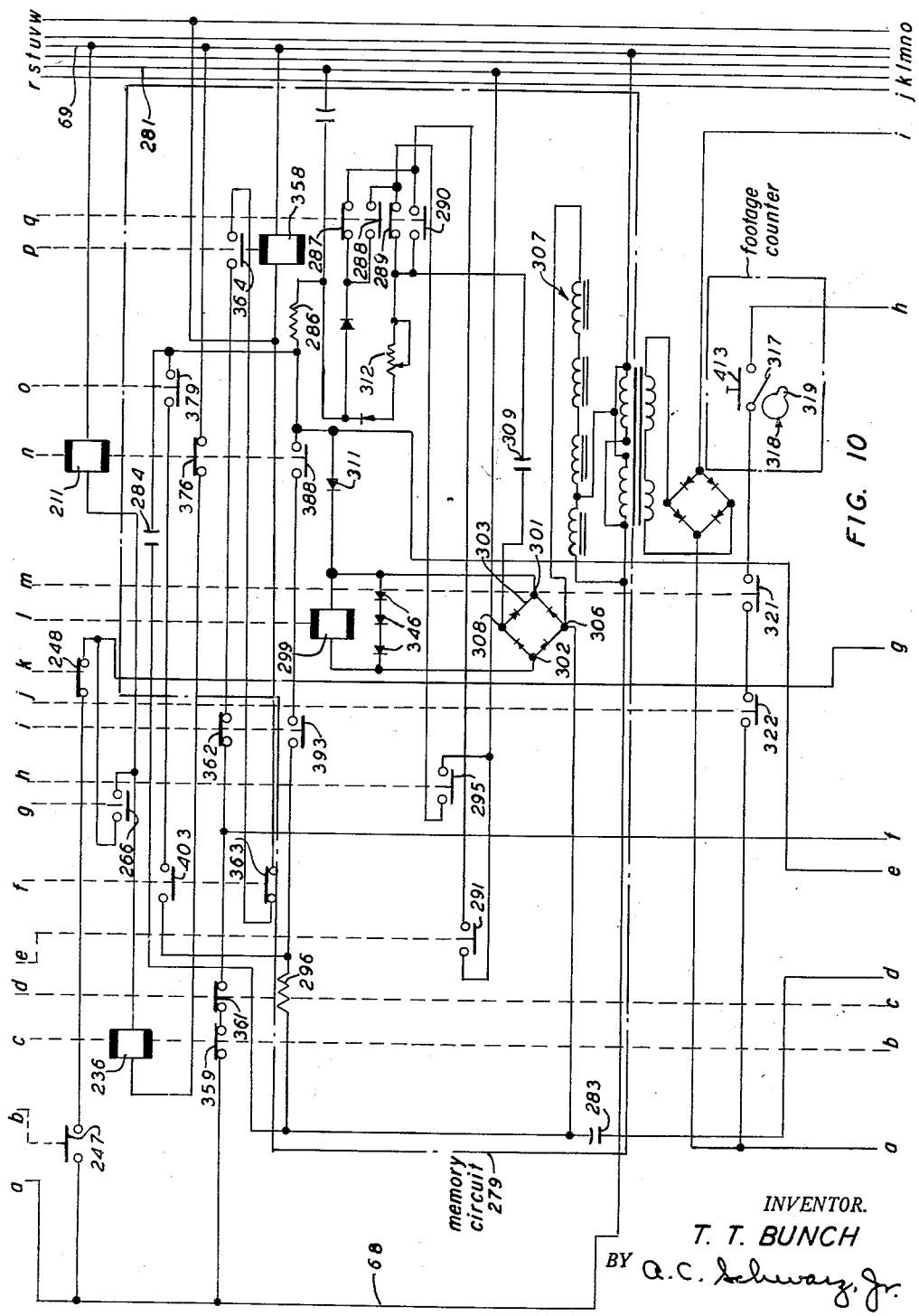
Figure 11:
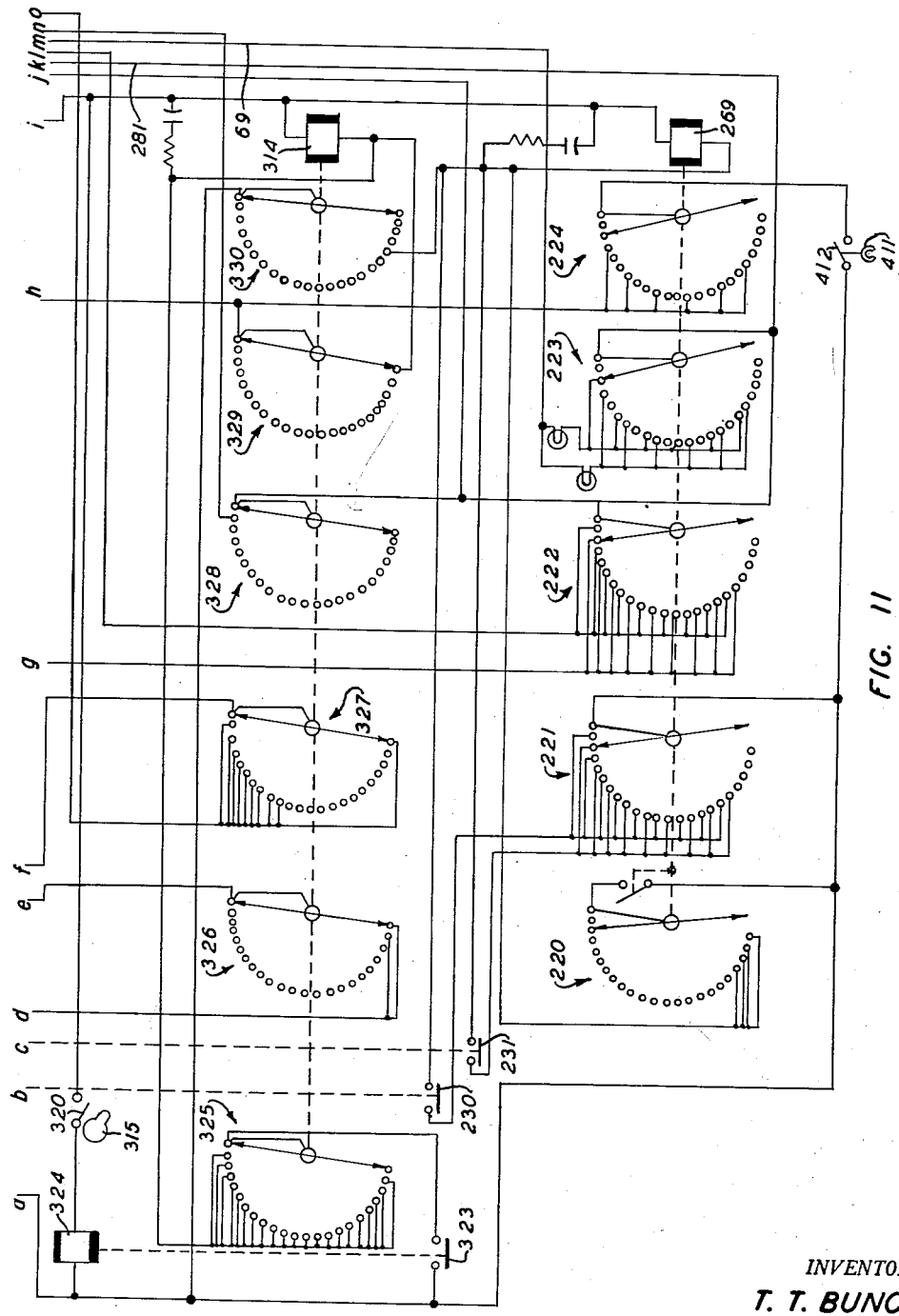

A sliding door 103 is positioned in front of the reels 14 and 16, serves to prevent operating personnel from touching moving parts of the reeling apparatus, and is suspended on a rod 105 extending between upright members 104. The door 103 is guided in a raceway 106 and actuates switches 108 and 109 connected to the control circuit as shown in Fig. 8 when the door 103 is moved from one side to the other.

The door 103 also serves to protect the operating personnel from any fragments of the strand 11 which might be thrown from the revolving reels 14 and 16 and snaggers 27 and 28, and is reciprocable to permit insertion and removal of the reels 14 and 16 into and from the reeling apparatus.

Figure 6:
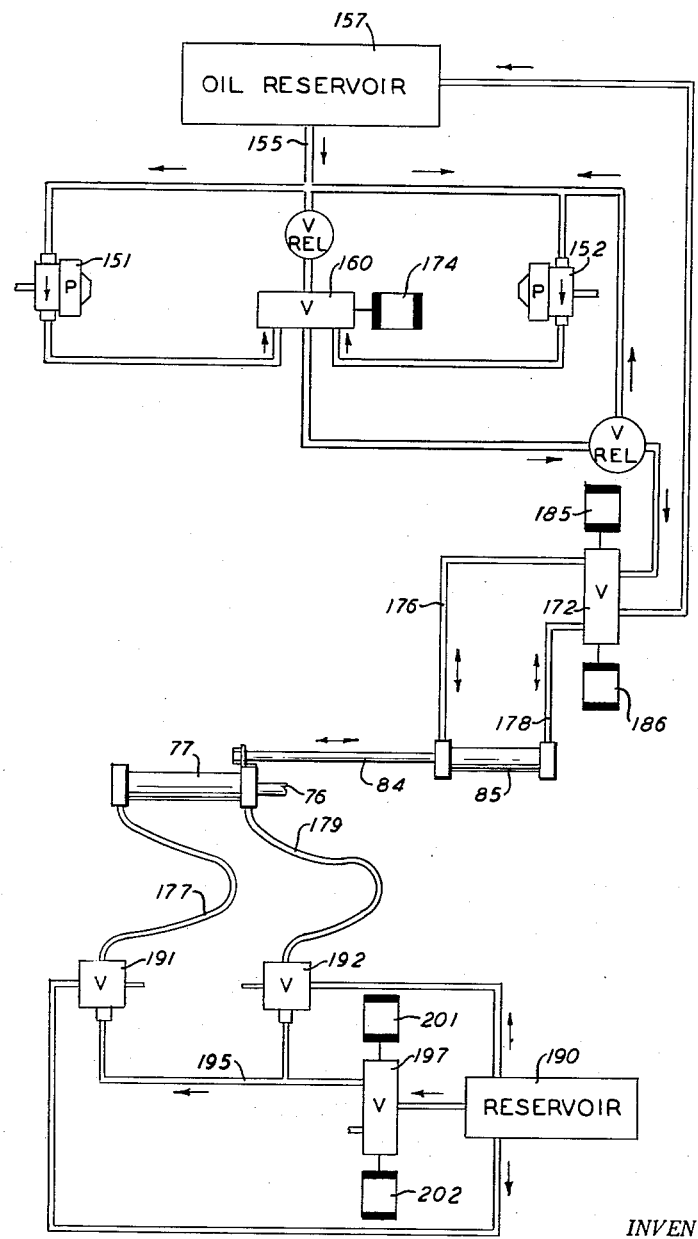
Fig. 6 is a schematic representation of a hydraulic and pneumatic system of the apparatus illustrated in Fig. 1, and Figs. 7 to 11, inclusive, are schematic diagrams of portions of the electrical control circuit for the apparatus illustrated in Fig. 1.
Figure 7:
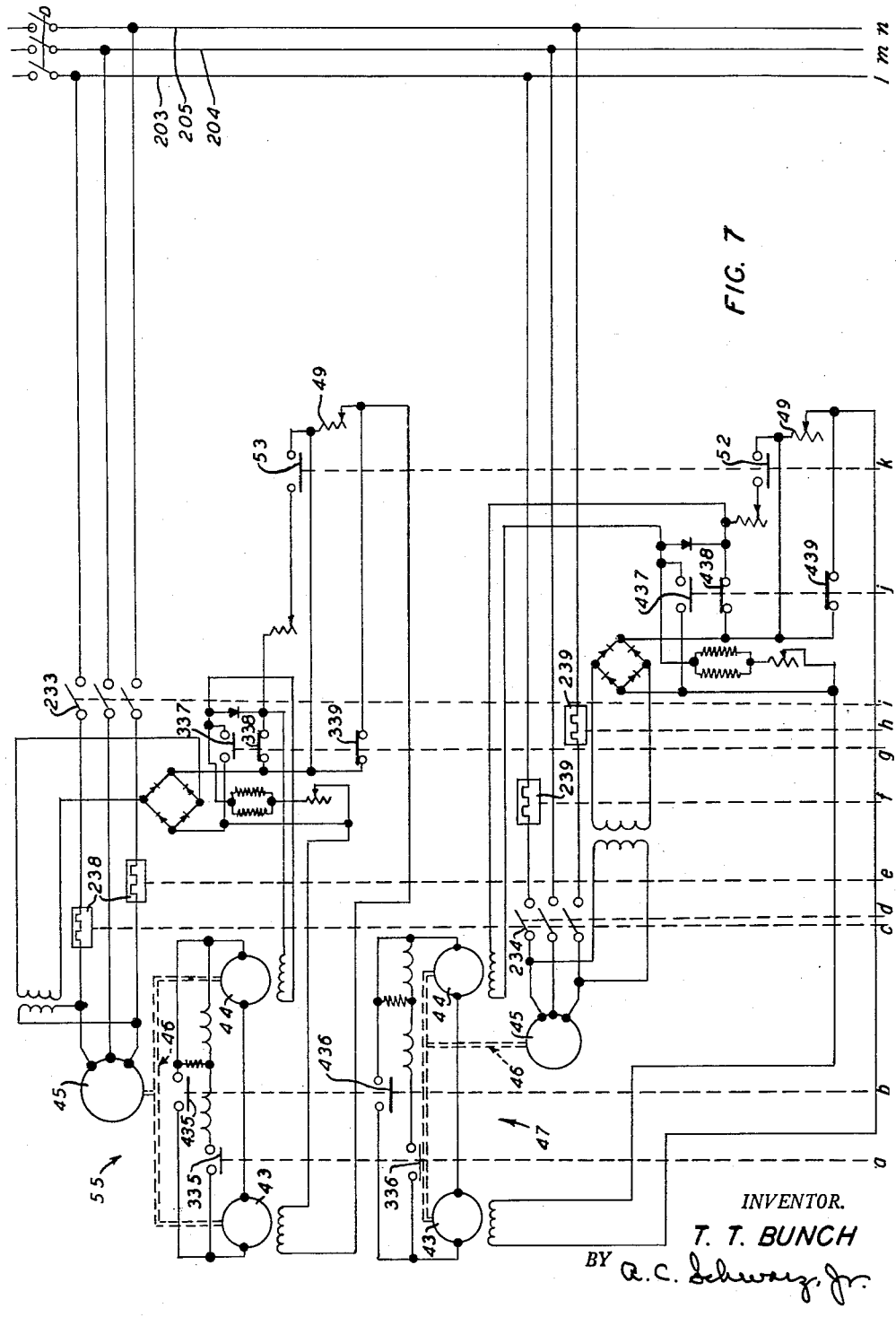

Referring now to Fig. 6, there is shown a schematic representation of a combined hydraulic and pneumatic system forming a portion of the strand reeling apparatus. This system includes a pair of constant displacement, rotary, hydraulic pumps 151 and 152 which are driven by the drive units 47 and 55, respectively (Fig. 2), through V belts 111 and 112 and pulleys 113, 114 and 115, at speeds proportional to the rotation speeds of their respective takeup reels 14 and 16. The adjustment of the speed of the pumps 151 and 152 may be achieved by changing the distance between the faces of two halves 116 and 117 of the pulleys 115—115 to adjust the affective pitch diameters of the pulleys 115—115.

The inside half of each of the pulleys 114—114 is slidably secured to shafts 118—118 by key means (not shown) for rotation therewith and are forced towards the outside half of each of the pulleys 114—114 and a collar 119 associated therewith by resilient means 121—121 which tend to change the effective pitch diameter of the pulleys 114—114 an amount which will compensate for the change of the effective diameter of the pulleys 115—115, when the effective diameters of the pulleys 115—115 are adjusted by the operator to change the speed of the pump 151 or 152. The shafts 118—118 are mounted rotatably in pillow blocks 122—122. The intake ports of both hydraulic pumps 151 and 152 are connected directly to a common supply line 155 (Fig. 6), which, in turn, communicates directly with a reservoir 157 containing a hydraulic fluid at atmospheric pressure.

A four-way, solenoid-operated, spring-return valve 160 is connected to the discharge ports of the hydraulic pumps 151 and 152 so that, normally the hydraulic fluid discharged from the hydraulic pump 152 is bypassed and returned to the reservoir 157 through the valve 160, to the supply line 155, while normally the valve 160 prevents the return of the hydraulic fluid discharged by the hydraulic pump 151 to the reservoir 157 and the hydraulic fluid from the latter pump flows to a four-way, spring-centered, double, solenoid-operated distributor reversing valve 172. However, when a solenoid 174 of the valve 160 is energized, the hydraulic fluid discharged from the pump 152 is directed to the distributor indexing valve 172, whereas the hydraulic fluid discharged by the hydraulic pump 151 is returned to the reservoir 157 through the valve 160.

The distributor reversing valve 172 normally is in its center position which, when in its central position, directs fluid from the pump 151 or 152 back to the reservoir 157 and is designed to control the direction of flow of the hydraulic fluid supplied by either of the hydraulic pumps 151 and 152 to the distributor cylinder 85 when actuated by solenoid 185 or 186. One end of the distributor cylinder 85 is connected to a corresponding port of the distributor reversing valve 172 by means of a line 176 and, similarly, the opposite end thereof is connected to another port on the distributor reversing valve 172 by a line 178.

The distributor reversing valve 172 is controlled by the two solenoids 185 and 186 which are energized alternately. When the solenoid 186 is energized, the valve 172 is operated to supply hydraulic fluid under pressure from either the hydraulic pump 151 or the hydraulic pump 152 to the lefthand end of the distributor cylinder 85, as viewed in Fig. 1, to move the piston rod 84 and attached distributor carriage 70 to the right. Conversely when the solenoid 185 is energized, the distributor carriage 70 is caused to move to the left.

The opposing ends of the indexing cylinder 77 are supplied from an air reservoir 190 through pilot-operated, three-way valves 191 and 192. The valves 191 and 192 are connected to opposing ends of the indexing cylinder 77 by means of flexible lines 177 and 179, respectively. If there is no pilot pressure supplied by the valve 197, the valve 191 connects the lefthand end of the indexing cylinder 77 directly to the air reservoir 190 so that the piston rod 76 is in its extended, righthand position, and the valve 192 connects the opposite end of the indexing cylinder 77 to exhaust at atmospheric pressure. However, when a pilot line 195 is connected to the air reservoir 190 through the three-way, double-solenoid operated valve 197, the valves 191 and 192 are actuated so that the lefthand end of the indexing cylinder 77 is connected to exhaust through the valve 191 and the opposite end of the indexing cylinder 77 to the air reservoir 190 by the valve 192 so that the piston rod is held in the lefthand, retracted position, as shown in Fig. 1.

The valve 197 is provided with two solenoids 201 and 202 designed to be energized alternately. When the solenoid 201 is energized the pilot line 195 is connected to exhaust through the valve 197 to hold the distributor 70 in the righthand position or index the distributor 70 to the righthand position if it is not already in the righthand position. When the solenoid 202 is energized, the pilot line is connected to the air reservoir 190 through the valve 197 to actuate the valves 191 and 192 which holds the distributor 70 in the lefthand position or indexes the distributor 70 to the lefthand position if it is not already there.

Referring now to Figs. 7 to 11, inclusive, there is shown an electrical circuit for controlling the operation of the reeling apparatus. The electrical circuit includes three bus lines 203, 204 and 205 supplied from a suitable 440 volt, 3 phase, 60 cycle source of E.M.F. (not shown) through a suitable switch to the primary of the transformer 80, the secondary of which is connected to the bus bars 68 and 69. Connected across the bus lines 203 and 205 is a pair of motor starting relays 213 and 214 (Fig. 8), each of which is connected in series with an associated guard switch 108 or 109 which is normally open and is actuated by the guard door 103 as previously described. Connected in series with the relays 213 and 214 and the switches 108 and 109 are start buttons 218 and 219, respectively.

When one of the start buttons 218 or 219 is depressed, the associated relay 213 or 214 is energized to close a normally-open contact 233 or 234 (Fig. 7) resulting in the energization of the associated motor 45 of the drive units 55 or 47, respectively. Accordingly, when the relay 213 or 214 is deenergized by the opening of contacts 226 or 227, as will be explained later in the description of the operation of the invention, the associated drive unit 55 or 47, associated with the partially filled reel 16 or 14, all respectively, will be de-energized and permitted to coast, while the strand 11 is still being reeled thereon, to provide slack in the strand 11 necessary to prevent excessive stress from being introduced therein during a cutover operation.

The reel motor relay 213 or 214 is energized by depressing the start button 218 or 219, respectively, and energized through normally-closed emergency stop button 199 or 200 and normally-closed, time-to-close contact 226 or 227 associated with relay 236 or 237, respectively, and normally-closed motor overload contact 228—228 or 229—229 associated with current sensing relays 238—238 or 239—239, respectively. Lights 241 and 242 are connected in parallel with the motor starting relays 213 and 214, respectively, to indicate to the operating personnel that the motor 45 of the drive unit 55 or 47 is energized. Connected in parallel with the motor starting relay 213 or 214 are relays 206 and 208 or 207 and 209, respectively.

Each of the start buttons 218 and 219 is provided with two contacts 243 (Fig. 8) and 244 (Fig. 9), and 246 (Fig. 8) and 247 (Fig. 10), respectively, and depending upon which of the buttons 218 and 219 is pressed first, the strand 11 will be taken up on the reel 14 or 16 associated with their respective drive units 47 or 55 if properly connected thereto. This means that if the left start button 218 is depressed, the distributor 70 will index to the left if the distributor 70 is in the right reel position and will stay in the left reel position if the distributor 70 is in that position at the time the start button 218 is depressed.

If either reel 14 or 16 is started already, the relay 207 or 206 will be energized and normally-closed contacts 249 or 248, respectively, associated therewith will be open and prevent the relay 210 or 211 from being energized to close normally-open, time-to-close contacts 215 or 216 associated therewith and thus prevent an associated distributor indexing circuit, designated generally by the numeral 251 or 252, from being energized as a result of depressing the start button 219 or 218 and closing the contact 247 or 244, respectively.

When either the start relay 213 or 214 is energized, it closes contact 253 or 254, respectively, associated therewith in a respective holding circuit to hold the associated relay 213 or 214 energized and permit the operator to release the normally-open start button 218 or 219 without causing the associated motor to stop.

The guard door 103 is provided with normally-open contact switches 108 and 109 on opposing sides of the door 103 and actuated thereby. Switch 108 is located on the lefthand side of the door 103 and is actuated by the door 103 when it is in the central position or to the lefthand position but the limit switch 108 is allowed to open up as the door 103 is moved to the right of the central position. This limit switch 108 prevents the left reel drive unit 55 from being energized unless the door 103 is in the central position or to the left which in both cases it covers up the lefthand reel 16. The limit switch 109 is allowed to open up if the door 103 is to the left of the central position. This prevents the right reel drive unit 47 from being energized unless the door 103 is in the central position or to the right which, in both cases, the door 103 is positioned in front of the righthand reel 14.

Associated with each motor relay 213 and 214 is a solenoid 258 or 259 and a spring-biased latch 261 or 262, respectively (see Figs. 1 and 3). Solenoid 258 is energized to hold the latch 261 in the retracted position when the left reel drive unit 55 is not energized because the relay 206 is not energized to open up a normally-closed, time-to-close contact 264, since if the left reel drive unit 55 is energized, the relay 206 is energized which opens up the normally-closed contact 264. The contact 264 is a time-to-close contact and thus delays the energization of the solenoid 258 to prevent the guard door 103 from being opened until the drive unit 55 has stopped. The latch 261 associated with the solenoid 258 projects adjacent to the right edge of the door 103 which permits the door 103 to be moved to the extreme right position when the solenoid 258 is energized to retract the latch 261, and thus permits the removal of the left reel 16.

The solenoid 259 is energized whenever the right reel drive unit 47 is not energized and the relay 207 is not energized to open up the normally-closed, time-to-close contact 267. The solenoid 259 permits the door 103 to be moved to the left to permit removal of the right reel 14 when the solenoid 259 is energized. When the drive units 55 and 47 are both running and the solenoids 258 and 259 are both deenergized, the guard door 103 is locked in the central position and cannot be moved in either direction. The guard door 103 must be in the central position with both switches 108 and 109 in the closed position in order to have both drive units 47 and 55 energized to permit the takeup apparatus to cutover from one reel to the other.

When one of the start buttons 218 or 219 is depressed the associated start relay solenoid 213 or 214 is energized and the drive unit 55 or 47 starts. If neither drive unit 47 nor 55 has previously beeen running, neither relay 207 nor 206 will be energized. Therefore, the normally-closed contact 248 or 249 of relay 206 or 207, respectively, will complete a circuit to the solenoid of relay 236 or 237. The energization of the relay 236 or 237 will close normally-open contact 230 or 231, respectively, which tends to complete a circuit to the solenoid of a stepping relay 269.

The stepping relay 269 is the type manufactured and distributed by the Western Electric Company which consists of a type 206 BE selector and type 26 A banks. The stepping relay 269 is normally utilized with dial or manual telephone equipment and consists of a maximum of 6 sets of double ended, rotary brushes mounted on a suitable shaft which is actuated through a ratchet and pawl by a solenoid. When the solenoid is energized, the pawl is cocked against a spring which actuates the relay 269 to step the brushes at the instant the solenoid is deenergized. The brushes are carried by the shaft and make twenty-two intermittent successive steps per each half revolution of the shaft. At least one end of each of the rotary brushes is in contact with one of a plurality of stacked, arcuate-shaped banks of contacts. Each bank has twenty-three contacts projecting radially inwardly toward the longitudinal axis of the shaft and perpendicular thereto. One of the contacts on each bank is longer than the others so as to be in continuous electrical contact with circular contacting fins projecting radially from the shaft to supply electrical power to the brushes. The relay 269, as utilized in the present apparatus, comprises five arcuate-shaped banks 220 to 224, inclusive, of contacts. The circuit to the solenoid of the relay 269 is completed if the contacts of bank 221 of relay 269 are in the proper position. If relay 269 does become energized and then deenergized, it steps to such a position as to create a circuit through bank 222 of relay 269 parallel to that which was established by the depressing of the start button 218 or 219. This parallel circuit then acts to hold the relays 210 or 211 energized.

When the relay 210 or 211 is energized it closes the normally-open contact 215 or 216, which passes a current to the solenoid 202 or 201, respectively, of the pneumatic valve 197 which causes the distributor 77 to be positioned at the reel 16 or 14, respectively, that is being driven by the drive unit 55 or 47 which is started.

When a capstan relay (not shown) is energized to close a normally-open contact 276 indicating that the capstan 12 is running, and when either relay 208 or 209 is energized indicating that one of the takeup drive units 55 or 47 is running, a memory circuit, designated generally by the numeral 279 (Fig. 10), is energized through a conductor 281 and the bus bars 68 and 69.

The memory circuit 279 includes two equal value capacitors 283 and 284 which normally are connected in parallel with each other and receiving or supplying a small current gated through a large resistor 286. The direction of this current is determined by the position of contacts 287 to 290, inclusive, of a relay 292 which gives it a sense of where the distributor 70 is stationed (at the left reel 16 or at the right reel 14). The direction of this current is further determined by whether a relay 293 or 294 is energized and the normally-open contact 291 or 295 associated therewith is closed which gives the current in the memory circuit 279 a sense of which direction the distributor 70 is travelling.

The combined sense of the three relays 292, 293 and 294 is such that whenever the distributor 70 is travelling toward the reel 14 or 16 opposite that at which it is stationed the capacitors 283 and 284 are being charged and whenever the distributor 70 is going in the direction away from the reel 14 or 16 opposite that at which it is stationed, the capacitors 283 and 284 are being discharged.

Parallel to these capacitors 283 and 284 is a small resistor 296 that can be connected into the circuit with the capacitors 283 and 284 to discharge them. Normally-open, instantaneous contacts 379 and 388 of the relays 210 and 211, respectively, give the circuit in which the resistor 296 is positioned a sense of which station the distributor 70 occupies. Normally-open, instantaneous contacts 393 and 403 of the relays 297 and 298, respectively, give this circuit in which the resistor 296 is positioned a sense of which limit of travel the distributor 70 has reached. The combined sense of these relays 210, 211, 297 and 298 is such that, at the end of the discharge cycle of the capacitors 283 and 284, before mentioned, the circuit of the associated resistor 296 momentarily is closed assuring that the capacitors 283 and 284 actually are brought to an exact zero reference voltage.

The coil of a relay 299 is attached to the direct current terminals 301 and 302 of a bridge rectifier 303. One common terminal 306 of the rectifier 303 is attached to the capacitors 283 and 284 and also to a leg of a high voltage transformer, designated generally by the numeral 307, and an alternating current terminal 308, which is connected through a small alternating current capacitor 309, is connected to the other leg of the transformer 307 through the conductor 281 and bus 68.

This capacitor 309 is in parallel with the discharge circuit, before described, and is governed by the same relay contacts 287 to 290, inclusive, 291 and 295. The effect of the capacitor 309 is to establish a small bias current across the coil of the relay 299 whenever the memory capacitors 283 and 284 are being discharged. The coil of relay 299 also has a circuit parallel to the memory capacitors 283 and 284 but connected through a rectifier 311 which will pass current in the discharging direction and hold off current in the charging direction.

In operation, the capacitors 283 and 284 are always charged before they are discharged, thus the rectifier 311 initially builds up a relatively large inverse voltage corresponding to the charge built up in the memory capacitors 283 and 284. During the discharge cycle, the rectifier 311 first must lose its inverse voltage before it can conduct which means that the capacitors 283 and 284 must be discharged beyond zero by approximately one third of a volt before the coil of relay 299 receives any current other than the bias current already described. Thus, since the charge current and the discharge current are adjusted through the resistors 312 and 286 to be equal, and, since the mechanical drive of the distributor 70 is such that the duration of travel in one direction is equal to the duration of travel in the other direction, the capacitors 283 and 284 as a pair never pass through zero and the relay 299 is never energized beyond its bias during normal cycling.

The coil of a relay 314, which relay is similar to relay 269, except that it comprises six contact banks, designated generally by the numerals 325 to 330, inclusive, is energized when a circuit is completed through its own contact on bank 329, which is closed initially from a switch 317 actuated by a counter, designated generally by the numeral 318, and through normally-open contacts 321 and 322, both of the relays 208 and 209, the coils of which are energized when their respective drive units 47 and 55 are running. The switch 317 is closed by a cam 319 at the end of a predetermined count by the counter 318. The counter 318 is geared to the capstan 12 and actuated thereby to measure the length of the strand 11 fed to the takeup apparatus thereby. The closing and opening of the counter switch 317 therefore will cause the relay 314 to move off its normal position.

The coil of relay 314 also has a circuit connected through each of the rest of its contacts on bank 325 of relay 314, and through a normally-open contact 323 of relay 324. The relay 324 is energized through a normally-open switch 320 which is closed by a cam 315 actuated by the capstan 12 once for each 10 feet of strand 11 that the capstan 12 feeds to the takeup apparatus. Therefore, when relay 314 is off its initial position it advances one step for every 10 feet of travel of the pitch surface of the capstan until it returns to its initial position.

One of the memory capacitors 283 likewise is in series with the contact on the bank 326 of relay 314 when relay 314 is in its initial position so that when the relay 314 advances off its initial position, the other memory capacitor 284 receives all the current that previously had been divided equally between the capacitors 283 and 284 and this causes the rate of discharge of capacitor 284 to be double. Simultaneously, when the contact on the bank 328 of relay 314 is closed, a circuit through normally-closed, instantaneous contact 341 or normally-open, instantaneous contact 342 of relay 211, which indicates the station occupied by the distributor 70, operates to energize the coil of either relay 297 or 298. The operation of these circuits are such that the distributor 70 always is driven in the direction that corresponds to discharging the memory capacitors 283 and 284, which is toward the outside flange 35 of the reel 14 or 16 onto which it is distributing.

Referring now to the memory circuit 279 (see Fig. 10), the capacitor 284 remaining in the circuit 279 will give up its charge when the distributor 70 has travelled just half a distance toward its destination. After the capacitor 284 has lost its initial charge, the discharge current tends to drive it toward a charge of opposite polarity but the parallel circuit consisting of the coil of the relay 299 and the rectifier 311 operates and the discharge current, instead, is diverted through the coil of the relay 299. The combined effect of this diverted discharge current and the initial bias current is such that relay 299 is energized to close a contact 347.

The coil of relay 299 is protected against over voltage by the presence of three rectifiers 346—346 connected in series with each other and in parallel to the coil of the relay 299 with a polarity sense such that after the coil of the relay 299 has been driven to an I.R. drop of approximately 1.2 volts, the forward conduction of the rectifiers 346—346 takes over and chokes off any serious increase of this voltage.

It should be noted that the effect of the bridge rectifier 303 connected to the coil of the relay 299 is such that any I.R. voltage drop of the opposite polarity likewise is restrained from exceeding 0.8 volt, thus the coil is fully protected against currents up to some 25 amperes resulting from any stray conditions of voltage.

When relay 299 is energized the normally-open contact 347 associated therewith is closed and, acting in conjunction with the normally-closed, instantaneous contact 348 and normally-open, instantaneous contact 349 of relay 210 which indicates where the distributor 70 is stationed, energizes either relay 297 or relay 298. The operation of these circuits is such that the distributor always is driven in the direction of the other reel 14 or 16, corresponding to charging the memory capacitors 283 and 284.

The function of these circuits is interlocked at times against having effect by a normally-open contact 351 of relay 352 which has a sense of whether or not the machine is operating at normal speed and by normally-open, instantaneous contacts 353 and 354 of relays 208 and 209, respectively, or by normally-open, instantaneous contacts 378 and 382 of relays 208 and 209, respectively, which indicates whether or not both takeup drive units 47 and 55 are running. Thus, the effect of the memory circuit 279 upon the performance of the takeup apparatus occurs only after conditions are stabilized, otherwise the nonuniform rate at which the distributor 70 then moves might tend to upset the system and bring about undesired types of action.

The coil of a relay 358 is connected across the line through normally-closed, instantaneous contacts 359 and 361 of relays 236 and 237, respectively, in series with the contacts of the bank 327 of relay 314. In parallel with these contacts on the bank 327 of the relay 314 are normally-closed, instantaneous contacts 362 and 363 of relays 297 and 298, respectively, and a normally-open, instantaneous contact 364 of the relay 358. Therefore, after the bank 327 of the relay 314 has advanced through its first nine steps, its part of the circuit containing the coil of the relay 358 is open.

At this time, the relay 299 is in process of reversing the direction of distributor 70 so that it is advancing toward the opposite reel 14 or 16 and the actuation of the relay 297 or relay 298 already should have taken place. Therefore, if the circuits are functioning properly, the last occasion upon which the relay 297 or 298 is actuated will be when the distributor 70 reaches the end of its travel toward the opposite reel 14 or 16 and engages the corresponding limit switch 93 or 97. When this takes place, the circuit including the coil of relay 358 is broken and its own holding contact 364 is opened.

When the relay 358 was deenergized, it opened a normally-open, instantaneous contact 365 which deenergized the relay 293, which in turn opened a normally-open contact 396 to deenergize the solenoid 185, or it deenergized the relay 294 which opens up a normally-open contact 408 to deenergize the solenoid 186 which allows the valve 172 associated with the distributing cylinder 85 to assume its neutral position and divert all fluid flow from the cylinder 85, thus causing the distributor 70 to dwell near the inside flange if it is not time for the cutover to occur. The cutover is always initiated when the distributor 70 is near the inner flange 35 of the reel 14 or 16.

After this, the only way that relay 358 can be reenergized is after bank 327 of the relay 314 has returned to its normal position. However, when relay 314 of bank 330 reaches a position where the contact is closed which causes relay 269 to be energized which when deenergized will step to its next position, which in turn, will cause either relay 236 or relay 237 to be energized through bank 222 of relay 269 and normally-closed contact 359 or 361, respectively, thereof holding off reenergizing of the relay 358 until after the cutover from one reel 14 or 16 to the other has taken place.

Another action performed by relay 236 or 237 is to deenergize the drive units 47 or 55 driving the reel 14 or 16 which has been in use and allowing the reel 14 or 16 to drift to provide slack in the strand 11 to permit a cutover from one reel to the other to take place without introducing excessive stresses therein. The reel 14 or 16 coasts to a stop as a result of the inherent friction in transmission 46 in the drive unit 47 or 55.

Relays 210 and 211 are in parallel with relays 237 and 236, respectively, and are energized simultaneously. After a time delay, the relay 210 or 211 closes the normally-open, time-to-close contact 215 or 216 which results in the energization of solenoid 202 or 201 which actuates the cutover valve 197 which in turn results in the distributor 70 being indexed to the new reel position.

Simultaneously, a normally-closed, time-to-close contact 374 (Fig. 9) or 376 (Fig. 10) of relay 210 or 211 breaks the circuit energizing the coil of the relay 237 or 236. The relay 236 or 237 is deenergized and the contact 226 or 227 opened to deenergize the drive unit 55 or 47, respectively. The drive unit 47 or 55 which was deenergized by relay 237 or 236 can be restarted by again depressing the start button 218 or 219.

Through the cooperation of the memory circuit 279 with other portions of the control circuit, a splice in the wire in the strand 11 or a predetermined section of the strand 11 can be positioned on the trailing end of the strand 11 of the filled reel 14 or 16.

The splice is placed in a clip 411 on a switch 412 which is connected in series with the contacts of the bank 224 of the relay 269, which has a contact for every third step of the relay 269. This is so constructed because, in the specific embodiment of the apparatus, the length of the unjacketed strand 11 on the supply reel is three times as long as the length of the jacketed strand 11 on the takeup reel 14 or 16. Thus, in normal operation one splice passes through the apparatus for every three reels of the jacketed strand 11 taken up on the takeup reels 14 and 16, but because of inherent inaccuracy in measuring equipment it is practically impossible to determine the exact location of the splice by measuring instruments.

The splice is placed in the strand 11 between the supply reels and attached to the clip 411 which will close the switch 412 but will have no effect on the circuit because the bank 224 of relay 269 is open and will stay open until the second takeup reel is filled and the relay 269 has stepped to close a contact on bank 224 which initiates the cutover to fill a third reel 14 or 16. At that time, the counter has no effect on the circuit since the relay 314 will already be energized through the switch 412 and the contact on bank 224 of relay 269 but the relay 314 cannot step to initiate a cutover cycle until deenergized, which then can result only when the splice is pulled from the clip 411 to open the switch 412 and thus initiate cutover which will proceed as previously described in connection with other cutovers.

The position of the splice is coordinated with the position of the distributor 70 to insure that the splice is on the trailing end of the strand 11 on the full reel 14 or 16. The speed of the distributor 70 is adjusted to the proportional length of the strand 11 being taken up since the speed of the distributor 70 is responsive to the speed of the reel 14 or 16 which has a preselected speed and is going to be constant depending on the speed of the reel 14 or 16 and if the machine is slowed down for some reason or other then the distributor 70 will slow down a proportional amount and thus the same number of feet of the strand 11 will be fed to the takeup reel 14 or 16 for each traverse of the distributor 70, assuming that the diameter of winding surface is the same in each case.

The signal for a cutover is received by the control circuit through the actuation of a reset button 413, the counter switch 317 or the splice switch 412 when the distributor 70 is in transit but is positioned a distance X (see Fig. 2) from the inside flange 35 of the reel 14 or 16 and, as previously described, the distributor 70 will be directed immediately toward the outside flange 35 regardless of the direction of travel at that time. The travel of the distributor 70 toward the outside flange 35 will be continued until the distributor 70 has travelled just one-half the distance from the place it was located at the time it received the signal and the limit of the travel of the distributor 70 in that direction under normal circumstances. At the time the distributor 70 has travelled the distance of $$\frac{(Y-X)}{2}$$

it is directed in the opposite direction which is toward the opposite reel 14 or 16 and travels a distance of $$\frac{Y-X}{2}+X$$

The distance Y is a constant and is the normal distance of travel of the distributor from one limit to the other while distributing on one reel or the other. This means that the distributor travels a distance of $$\frac{2(Y-X)}{2}+X$$

which is equal to Y from the time the control circuit receives the signal for the cutover and the time the distributor is indexed to the other reel 14 or 16, which is eighteen steps of the relay 314 or approximately 180 feet of travel of the strand 11.

An alternate embodiment of the apparatus may be constructed by the utilization of a nodding sheave 561 as illustrated on Fig. 5 instead of the sheave 61. The nodding sheave 561 is supported by a horizontal arm 563 which is pivotally supported on a vertical member 562 secured to the upright member 74 by appropriate means. A guide 581 similar to 81 is provided for the same purpose as previously described for guide 81. The arm 563 is oscillated by means of a fast-acting, fluid-actuated, piston-cylinder assembly 564. The sheave 561 is identical in structure to that of sheave 61 and is utilized to create slack in the strand 11 during the cutover cycle which would eliminate the need for deenergizing the drive units 47 or 55 to create such slack and thus, the contacts 226 and 227 of relays 236 and 237, respectively, may be eliminated in the circuit as shown on Figs. 9 and 10 or may be caused to be actuated at later times to deenergize the drive units 47 or 55 to permit removal of the full reel 14 or 16. The relays 236 and 237 may be utilized to actuate valves which will direct fluid to the piston cylinder assembly 564 to move the nodding sheave 561 rapidly downwardly to create slack in the strand 11 at the desired time for the instant cutover and then move the sheave 561 upwardly gradually in preparation for a subsequent cutover.

*Operation*

After it has been decided which takeup reel will be used first, the machine is started by energizing the direct-current machines 43 and 44 and the motor 45 associated with the drive unit 47 or 55 of that reel. The strand 11 will be taken up on that reel until the operator is satisfied that the insulated wire being fed to the takeup apparatus will meet the electrical and physical requirements.

Assuming that the distributor 70 is positioned over the right takeup reel 14 and it is desirable to use the left takeup reel 16 first, and also assuming that the guard door 103 is positioned centrally of the takeup reels 14 and 16 and thus the limit switches 108 and 109 are closed, the start button 218 associated with the left reel 16 will be depressed by the operator which will cause the relays 213, 206 and 208 to be energized and the light 241 to be illuminated.

The energization of the relay 213 will close a normally-open contact 253 to form a holding circuit for the relays 213, 206 and 208 across the contact 243 of the start button 218, so that the start button 218 may be released subsequently, and also will close the normally-open contacts 233 associated with the left reel drive unit 55 to energize the machines 43 and 44 and the motor 45 associated therewith.

The energization of the relay 206 will open a normally-closed time-to-close contact 264 to deenergize the solenoid 258 which allows a spring-biased latch 261 associated with the solenoid 258 to lock the guard door 103 in the central position or to the left. The energization of the relay 206 also closes a normally-open contact 265 and opens the normally-closed contact 248. The opening of the normally-closed contact 248 prevents the closure of the contacts 246 and 247 of start button 219 from causing the distributor 70 to index to the right reel 14. The closure of the instantaneous contact 265 results in the energization of the relays 292, 210 and the solenoid 174 of the pump bypass valve 160 since the contact 249 associated with the relay 207 is closed when the right reel drive unit 47 is deenergized. At this time the start button 218 may be released.

The energization of the relay 208 closes normally-open instantaneous contacts 321, 353, 377 and 378. The closure of the instantaneous contact 265 resulted in the energization of the relay 292 which closed the normally-open contacts 288 and 290 and opened the normally-closed contacts 287 and 289 in the memory circuit 279.

The energization of relay 210 closes a normally-open contact 379 in the memory circuit 279, opens the normally-closed instantaneous contact 348, and closes the normally-open instantaneous contact 349 and the normally-open time-to-close contact 215.

The closure of the normally-open time-to-close contact 215 results in the energization of the solenoid 202, and the relays 331 and 332 after a predetermined time. The energization of the relays 331 and 332 closes normally-open contacts 335, 336 and 337 and opens normally-closed contacts 338 and 339 to shift the machines 43 and 44 of the left reel drive unit 55 from a shunt field operation to a series field operation. The idle reel motor always runs on a shunt field and the working reel always runs on a series field operation, except that during starting the tension is reduced by adding some shunt field to the series field which is removed when the relay 54 is deenergized to open up the normally-open contact 53 when the speed of the capstan 12 reaches a predetermined speed. Energization of the solenoid 202 results in the indexing of the distributor 70 to the left reel position from the right reel position.

The strand reeling apparatus is now operating so that the machines 43 and 44 and the motor 45 of drive unit 55 are energized and the left takeup reel 16 is in the process of being filled. The right drive unit 47 is assumed to be deenergized at this time but the right takeup reel 14 is mounted on the reel supporting centers 22 and 29. The piston rod of the indexing cylinder 77 is in its fully retracted lefthand position.

As the strand 11 advances continuously, the distributor carriage 70 is reciprocated to distribute the convolutions of the strand 11 in uniform layers upon the winding drum 34 or winding surface of the left takeup reel 16. At this time the reciprocation of the piston rod 84 of the distributing cylinder 85 is controlled by the ball 87 which the cam 86 causes to operate the limit switches 92 and 93 alternately.

When the limit switch 92 is operated by the ball 87, the contact thereof closes to energize the relay 298 which opens a normally-closed contact 401 to deenergize the solenoid 185 and closes contact 402 resulting in the energization of relay 294 to close and hold closed the contact 408 resulting in the energization of the solenoid 186 of the distributor reversing valve 172 thereby reversing the direction of flow of the hydraulic fluid in the lines 176 and 178. The hydraulic fluid now enters the lefthand end of the distributing cylinder 85 and causes other fluid to exit from the righthand end thereof so that the distributor carriage 70 is moved to the right at a speed proportional to the rotational speed of the lefthand drive unit 55.

The movement of the distributor carriage 70 is reversed again when the ball 87 operates the limit switch 93 since the operation of the latter results in the energization of the relay 297 to open a normally-closed contact 392 to deenergize the solenoid 186 and to close the normally-open contact 391 to energize the relay 293, thus in turn, closes and holds closed the contact 396 to energize the solenoid 185 of the distributor reversing valve 172 to reverse the distributor 70. In this manner, the distribution of the strand 11 continues throughout the normal reeling of the strand 11 upon the takeup reel 16.

The operator depresses the right reel start button 219 which energizes relays 207 and 209, 214 and illuminates the light 243, which starts the idle reel 14 and brings it slightly above its required peripheral drum speed. The energization of the relay 214 will close the normally-open contact 254 to form a holding circuit for the relays 207, 209 and 214 across the start button 219, so that the start button 219 may be released subsequently, and also closes the normally-open contacts 243—243 associated with the right reel drive unit 47 to energize the machines 43 and 44 and the motor 45 associated therewith.

The energization of the relay 207 opens the normally-closed contact 267 to deenergize solenoid 259 which allows the spring-biased latch 262 associated with the solenoid 259 to lock the guard door 103 in the central position or to the right. Since the latch 261 is already engaging the door 103, the latches 261 and 262 will cooperate to lock the door 103 in the central position.

The energization of the relay 207 also closes a normally-open contact 266 and opens the normally-closed contact 249. The opening of the normally-closed contact 249 prevents the closure of the contacts 243 and 244 of the start button 218 from later causing the distributor 70 to index to the left reel 16. The closure of the instantaneous contact 266 would reuslt in the energization of the relays 211 and 236 but for the fact that contact 248 associated with relay 206 is always open when the drive unit 47 is energized and bank number 222 of relay 269 is not at this time in the proper position to pass current to the relays 211 and 236 from the memory circuit 279. The energization of the relay 209 closes the normally-open, instantaneous contacts 322, 354, 381 and 382.

The strand 11 which is being reeled on the left reel 16 continues until the operator is sure that the wire being produced by the extruder (not shown) is of sufficient quality to permit saving the same because the counter 318 is prevented from being energized for acting automatically until after the apparatus has completed one cutover as was described with regard to the spark testing apparatus (not shown).

The machine is now ready for a cutover to take place, and since both of the reels 14 and 16 are running, the relays 208 and 209 are energized and the associated contacts 321, 353, 377, 378, 322, 354, 381 and 382 are closed. The reset button 413 on the counter is depressed by the operator and the relay 314 will be energized through bank 329 thereof which is in its normal position, which will result in the relay 314 being stepped to the next position when deenergized at the time the operator releases the reset button 413. When the relay 314 is stepped off its normal position, the relay 314 may be energized and deenergized by the actuation of normally-open contact 323 when the relay 324 associated therewith is energized and deenergized with each 10 foot travel of the capstan 12.

The closure of the switch 320 energizes the relay 324 to actuate the contact 323 which energizes and deenergizes the relay 314 through the bank 325 to step it until it moves to its normal position and at that time the closure of the contact 323 has no effect on the stepping relay 314 since the bank 325 thereof is not connected to the normal position as is bank 329. Thus, the relay 314 remains stationary in the normal position until it receives a signal from the counter switch 317, the splice switch 412 or the reset button 413. The stepping relay 314 is of the type that is cocked against a spring but does not advance when it is energized and it is actuated by the spring to advance instantaneously to the next position on the banks thereof when it is deenergized.

The memory capacitor 283 is in series with a contact on bank 326 of the relay 314 which closes when the relay 314 is in its normal position and opens when the relay 314 advances off its normal position, so that the memory capacitor 284 alone receives or contributes all of the current that previously had been contributed to or received from both of the capacitors 283 and 284 in equal amounts, which causes the rate of discharge of the capacitor 284 to be double. Simultaneously, when the contact on the bank 328 of the relay 314 is closed, circuits through the normally-closed, instantaneous contacts 341 of relay 211, which give a sense of the station occupied by the distributor 70, operate to energize the coil of relay 297.

When relay 297 is energized it closes normally-open, instantaneous contacts 391 and 393 and opens the normally-closed, instantaneous contacts 362 and 392. The closure of the contact 391 causes the relay 293 to be energized which closes normally-open contacts 291, 396 and 397 and opens normally-closed contact 398. The closure of the contact 396 results in the energization of the solenoid 185 which actuates the valve 172 resulting in the distributor 70 being driven away from the reel 14. The operation of these circuits is always such that the distributor 70 always is driven in the direction that corresponds to the direction for which the memory capacitors 283 and 284 would be discharging which is toward the outside flange 35 of the reel 16 or 14 onto which the strand 11 is being distributed.

In the memory circuit 279, the capacitor 284 remains in the circuit which gives up its charge when the distributor 70 travels just half a distance toward its destination. After the capacitor 284 has lost its memory charge, the discharge current tends to drive it towards a charge of opposite polarity, but the parallel circuit consisting of the coil of the relay 299 and the rectifier 311 comes into use and the discharge current, instead, is diverted through the coil of the relay 299. The combined effect on the coil of the relay 299 of this diverted charge and the initial bias current is such that the relay 299 is actuated to close the contact 347.

When the relay 299 is energized, the normally-open contact 347 associated therewith is closed which acts in conjunction with the closed, normally-open, instantaneous contact 349 of the relay 210 (which indicate that the distributor 70 is stationed at the left reel 16) to cause relay 298 to be energized. The energization of the relay 298 opens the normally-closed, instantaneous contacts 401 and 363, and closes normally-open, instantaneous contacts 402 and 403.

The closure of the contact 402 causes the relay 294 to be energized which closes the normally-open contacts 295, 407 and 408 and opens normally-closed contact 406. The closure of the contact 408 results in the energization of the solenoid 186 which actuates the valve 172 causing the distributor 70 to be reversed and directed toward the opposite reel 14. The operation of these circuits is always such that the distributor is driven in the direction of reel 14 corresponding to the charging of the memory capacitors 283 and 284.

The coil of the relay 258 is connected across the line through normally-closed, instantaneous contacts 359 and 361 of relays 236 and 237, respectively, and in series with the contacts of bank 327 of relay 314. In parallel with the contacts on bank 327 of the relay 314, are normally-closed, instantaneous contacts 362 and 363 of relays 297 and 298, respectively, and the normally-open, instantaneous contact 364 of the relay 358. Therefore, after the bank 327 of relay 314 has advanced through its first nine steps, its part of the circuit is open. This permits the coil of the relay 358 to be deenergized to open a normally-open, instantaneous contact 365 during part of the cutover cycle by the energization of either relay 297 or 298, but only after bank 327 of relay 314 has advanced past its first nine steps and ninety feet of strand has been fed into the reel 16.

At this time the relay 299 has been energized and is in the process of causing the direction of the distributor 70 to be reversed so that it advances towards the opposite reel 14 and the actuation of relay 298 already has taken place. The relay 299 is used to insure that the distributor is always moved in the desired direction, because when all the limit switches are actuated the direction in which the distributor would be directed is unpredictable. Therefore, if the circuits are functioning normally, the next occasion upon which the relay 297 or 298 is actuated will be when the distributor 70 reaches the end of its travel toward the reel 14. When this takes place, a circuit including the coil of relay 358 is broken which deenergizes the relay 358, the holding contact 364 is opened, and the normally-open, instantaneous contact 365 is opened, which deenergizes the relay 293 and stops the distributor 70 in a position adjacent to the inside flange of the reel onto which it is directing the strand until a cutover takes place.

The distributor 70 stops because valve 172 is so constructed that fluid will only be directed to the cylinder 85 when either the solenoid 185 or 186 is energized. After this has happened, the only time that the relay 358 can be energized to close the normally-open, instantaneous contact 365 and permit the distributor 70 to be actuated is after the bank 327 of the relay 314 has returned to its normal position.

When the coil of the relay 314 completes a circuit from the contact of the reset button 413 through the contact on bank 329 of the relay 314, which is closed normally, the relay 314 will be energized and deenergized to move off its normal position. The coil of the relay 314 also has a circuit connected through each of the rest of its contacts on bank 325 thereof and through the normally-open contact 323 of the relay 324 which closes once for each ten feet of strand 11 that the capstan 12 feeds to the takeup apparatus. Therefore, when the relay 314 is off its normal position it is advanced one step for each ten feet of travel of the peripheral surface of the capstan. At such time as the relay 314 has stepped to the eighteenth position, the contact on bank 330 thereof will close resulting in the energization of the relay 269. When the relay 314 steps to the nineteenth contact thereof the contact on bank 330 thereof opens, deenergizing and causing the relay 269 to step to the next position which is an even numbered position, thus resulting in the energization of relays 211 and 236 by the memory circuit through bank 222 of relay 269.

The energization of the relay 211 closes the normally-open contact 388 in the memory circuit 279, opens the normally-closed, instantaneous contacts 376 and 341, and closes a normally-open, instantaneous contact 342 and a normally-open, time-to-close contact 216, which is adjusted to control the timing of the cutover.

The closure of contact 216 causes relays 333 and 334 and the solenoid 201 of the valve 197 to be energized after a predetermined time interval.

The closure of the contact on bank 222 of relay 269 which resulted in the energization of relay 236 caused the normally-closed, instantaneous contact 359, which is in series with the coil of relay 358, to be opened which causes the relay 358 to be deenergized momentarily resulting in the opening of the normally-open, instantaneous contacts 364 and 365 and closure of normally-closed, time-to-open contact 418. The opening of the contact 365 holds the distributor 70 stationary for a predetermined time interval of approximately three-fourths of a second while the relay 314 steps three times or during approximately 30 feet of travel of the strand 11. The energization of the relay 211 opens the normally-closed, time-to-open contact 376, which, after a time delay, results in the deenergization of the relay 236, which results in the closure of the contact 359.

Having the contact 359 closed at the same time as the now-closed contact 361 of the relay 237 causes the relay 358 to be energized to close the contacts 364 and 365 and open the contact 418 when the relay 314 returns to its normal position. Since the contact 418 is a time-to-open contact, the relay 297 is assured of being energized through the contacts 359 and 361, through the bank 327 of relay 314 and the normally-closed contact 348 of the relay 210. The energization of the relay 297 results in the closing of the contact 391 which in turn results in the relay 293 and thus the solenoid 185 being energized. Energization of relay 236 resulted in the closure of a normally-open, instantaneous contact 386 associated with the spark testing apparatus (not shown) resulting in the energization of the relay 384 which closes a normally-open contact 385 which is connected in parallel with the contacts 377 and 381, and 386 and 387 all of which are in series with the parallel circuit containing contacts 378 and 382. This results in the spark testing apparatus being energized continuously from the start up, subsequent to the first cutover from scrap material, during all subsequent reeling operations until such time as both drive units 47 and 55 of the takeup apparatus are deenergized.

The deenergization of the relay 236 resulted in the opening of a normally-closed, time-to-close contact 226 resulting in the deenergization of the relays 206, 208 and 213 which causes the machines 43 and 44 and the motor 45 of the left reel drive unit 55 to be deenergized and allowed to coast to provide slack in the strand 11 to permit a cutover to the right reel 14 without introducing excessive stresses in the strand during the cutover.

The left reel drive unit 55 will then coast to a stop as a result of the inherent friction therein.

The energization of the relay 211 which opened the normally-closed, instantaneous contact 341 and closed the normally-open, instantaneous contact 342 and also closed the normally-open, time-to-close contact 216 resulted in the energization of the relays 333 and 334. The energization of the relay 333 resulted in the opening of the normally-closed contacts 438 and 439 and the closing of the normally-open contact 437. The energization of the relay 334 resulted in the closure of the normally-open contacts 435 and 436.

The relays 331 and 332 were deenergized when the contact 215 of the relay 210 was opened at the time the bank 222 of the relay 269 shifted from the odd numbered position to an even numbered position to deenergize the relay 210. The deenergization of the relay 331 resulted in the closing of the normally-closed contacts 338 and 339 and the opening of the normally-open contact 337. The deenergization of the relay 332 resulted in the opening of the normally-open contacts 335 and 336.

The cooperation of the relays 333 and 334 with the relays 331 and 332 to close normally-open contacts 435, 436 and 437, open normally-closed contacts 438 and 439, close normally-closed contacts 338 and 339, and open normally-open contacts 335, 336 and 337, results in machines 43 and 44 of the right reel drive unit 47 being shifted from shunt field operation to series field operation and the machines 43 and 44 of the left reel drive unit 55 being shifted from series field operation to shunt field operation.

Energization of the relay 211, which closed the contact 216 after a time delay, caused the solenoid 201 of the valve 197 to be energized, and the opening of the contact 215 caused the solenoid 202 of the valve 197 to be deenergized. With the solenoid 201 energized, the valve 197 is connected so as to exhaust to the pilot line 195 and, accordingly, the lefthand end of the indexing cylinder 77 is connected to the air reservoir 190 so that the piston rod 76 thereof is thrown rapidly to the right carrying with it the distributor carriage 70 and the cam 86, and thus the distributor 70 is indexed to the right reel 14.

As the strand 11 is transferred from the full takeup reel 16 to the empty takeup reel 14, one of the fingers 57—57 on each of the rotating snagger wheels 27 and 28 catch a portion of the strand 11 and cooperate to carry it against the cutter 59, whereby the strand 11 is severed and the new leading end thereof is attached to the snagger 27 and wound on the winding drum 34 of the empty takeup reel 14. Thus, the reeling of the strand 11 commences on the winding drum 34 of the empty takeup reel 14.

Now that the cutover operation is completed, the reeling operation on the takeup reel 14 proceeds in the normal manner previously described in connection with the takeup reel 16. The takeup reel 16 is stopped subsequently by the inherent friction of the drive unit 55. The full reel 16 is removed from the reel supporting centers 23 and 31 and is replaced by another empty takeup reel 16 and the door is moved to the center position to close contact 108 in preparation for subsequent energization of takeup drive unit 55. The door 103 is opened by being moved to the right which is possible since the spring-biased latch 261 was retracted by the solenoid 258 when it was energized as a result of the contact 226 being opened and the contact 264 being closed. Thereafter, when the takeup reel 14 is nearly full, the drive unit 55 is again energized to rotate the empty takeup reel 16 as previously described and the apparatus again is in readiness for the next cutover operation to take place.

Since both of the reels 14 and 16 are running, the relays 208 and 209 are energized and associated contacts 321, 353, 377, 378, 322, 354, 381 and 382 are closed. The counter actuates the switch 317 and the relay 314 will be energized through bank 329 thereof which is in its normal position since the relay 314 always is returned to its normal position by the repeated actuation of the relay 324 through the repeated closure of the switch 320 on the capstan 12 which is actuated once for each ten feet of travel of the surface of the capstan as previously described.

The memory capacitor 283 is in series with the contact on the bank 326 of the relay 314, when the relay 314 is in its normal position, so that when the relay 314 advances off its normal position the contact on the bank 326 opens and the other memory capacitor 284 experiences all of the current that previously had been divided equally between the capacitors 283 and 284. This causes the rate of discharge of the capacitor 284 to be doubled. Simultaneously, when the contact on the bank 328 of relay 314 is closed, circuits through the normally-open, instantaneous contact 342 of the relay 211 which indicates the station occupied by the distributor 70 operates to energize the coil of the relay 298.

When the relay 298 is energized it opens the normally-closed, instantaneous contacts 401 and 363 and closes normally-open, instantaneous contacts 402 and 403. The closure of the contact 402 causes the relay 294 to be energized which closes the normally-open contacts 407 and 408 and opens the normally-closed contact 406. The closure of the contact 408 results in the energization of the solenoid 186 which actuates the valve 172. The operation of these circuits is such that the distributor 70 always is driven in the direction that corresponds to the discharging of the memory capacitors 283 and 284 which is toward the outside flange of the reel 14 onto which the strand is being distributed.

In the memory circuit 279, the capacitor 284 remains in the circuit which gives up its charge when the distributor 70 travels just half a distance towards its destination. After the initial charge of the capacitor 284 has been lost, the current tends to establish a charge of opposite polarity. The parallel circuit consisting of the coil of relay 299, and the rectifier 311 comes into use and current is diverted through the coil of the relay 299. The combined effect of this diverted current and the initial bias current is such that the relay 299 is energized to close the contact 347.

When the relay 299 is energized, the normally-open contact 347 associated therewith is closed which acts in conjunction with the normally-closed, instantaneous contact 348 of the relay 210 to indicate that the distributor 70 is stationed on the right reel and cause the relay 297 to be energized. When the relay 297 is energized it closes the normally-open, instantaneous contacts 391 and 393 and opens the normally-closed, instantaneous contacts 362 and 392. The closure of the contact 391 causes the relay 293 to be energized which in turn closes the normally-open contacts 291, 396 and 397 and opens the normally-closed contact 398. The closure of the contact 396 results in the energization of the solenoid 185 which actuates the valve 172 resulting in the distributor 70 being driven towards the reel 16. The operation of these circuits is such that the distributor 70 is driven in a direction of reel 16 corresponding to the charging of the memory capacitors 283 and 284.

The coil of the relay 358 is connected across the line through the normally-closed contacts 359 and 361 of the relays 236 and 237, respectively, and in series with the contacts of bank 327 of the relay 314. In parallel with the contacts of bank 327 of the relay 314 are the normally-closed, instantaneous contacts 362 and 363 of the relays 297 and 298, respectively, and the normally-open, instantaneous contact 364 of the relay 358. Therefore, after the bank 327 of the relay 314 has advanced through its first nine steps, to guard against malfunctioning of the relay 299, its part of the circuit is opened, as previously described.

Independent of the actuation of the relay 314 and at the proper instant to synchronize the arrival of the distributor 70 at the inner head 35 of the reel 14 with the occurrence of the cutover, the relay 299 is energized causing the direction of the distributor 70 to be reversed so that the distributor 70 advances towards the opposite reel 16. Therefore, if the circuits are functioning properly the next occasion upon which the relay 297 or 298 is actuated will be when the distributor reaches the end of its travel towards the reel 16. When this takes place, a circuit including the coil of the relay 358 is broken, which deenergizes the relay 358, opens the holding contact 364 and opens the normally-open, instantaneous contact 365 which deenergizes the relay 294 and stops the distributor 70. After this has happened, the only time that the relay 358 can be reenergized is after the bank 327 of the relay 314 has returned to its normal position.

When a circuit is made and broken by the contact 317 of the counter 318 through the contact on bank 329 of the relay 314 to the coil thereof, the relay 314 will be energized and deenergized to move off its normal position. The coil of the relay 314 also has a circuit connected through each of the rest of its contacts on the bank 325 thereof and through the normally-open contact 323 of the relay 324 which closes once for each ten feet of strand 11 that the capstan 12 feeds to the takeup apparatus. Therefore, when the relay 314 is off its normal position it is advanced one step for each ten feet of travel of the peripheral surface of the capstan until it is returned to its normal position.

At such time as the relay 314 is stepped to the eighteenth position, the contact on bank 330 thereof will close resulting in the energization of the relay 269 which is deenergized when the relay 314 steps to the nineteeth position thereof and causes the relay 269 to step to the next position which is an odd numbered position, thus, resulting in the energization of the relays 210 and 237 by the memory circuit through the bank 222 of the relay 269.

The energization of the relay 210 closes the normally-open contact 379 in the memory circuit 279, opens a normally-closed, instantaneous contact 348, and closes a normally-open, instantaneous contact 349 and a normally-open time-to-close contact 215.

The closure of the contact 215 causes the relays 331 and 332 and the solenoid 202 of the valve 197 to be energized after a predetermined time interval. The closure of the contact on the bank 222 of the relay 269 which resulted in the energization of the relay 237 caused the normally-closed, instantaneous contact 361, which is in series with the coil of the relay 358, to be opened which caused the relay 358 to be deenergized momentarily resulting in the opening of the normally-open, instantaneous contacts 364 and 365 which holds the distributor 70 stationary for a predetermined time interval of approximately three-fourths of a second while the relay 314 steps the three places to its normal position or during approximately thirty feet of travel of the strand 11.

The energization of the relay 210 opens the normally-closed, time-to-open contact 374 resulting in the deenergization of the relay 237. The deenergization of the relay 237 resulted in the opening of the normally-closed, time-to-close contact 227 resulting in the deenergization of the relays 207, 209 and 214 which causes the right reel drive unit 47 to be deenergized and allowed to coast to provide slack in the strand 11 to permit a cutover to the left reel 16 without introducing excessive stresses in the strand 11 during the cutover. The right reel drive unit 47 will then coast to a stop as a result of the inherent friction therein.

The energization of the relay 210 opened the normally-closed, instantaneous contact 348 and closed the normally-open, instantaneous contact 349 and also closed the normally-open, time-to-close contact 215 which resulted in the energization of the relays 331 and 332 which cooperate with the relays 333 and 334, which were deenergized when the contact of relay 269 of the bank 222 shifted from the even position to an odd position, to close normally-open contacts 335, 336, and 337 and open normally-closed contacts 338 and 339, close normally-closed contacts 438 and 439 and to open normally-open contacts 436 and 437 which results in the machines 43 and 44 of the left reel drive unit 55 being shifted from shunt field operation to series field operation and the machines 43 and 44 of the right reel drive unit 47 being shifted from series field operation to shunt field operation.

The energization of the relay 210 closed the contact 215 to energize the solenoid 202 of the valve 197. The solenoid 201 of the valve 197 was deenergized as a result of the opening of the contact of bank 222 of the relay 269. With the solenoid 202 energized, the valve 197 is connected so as to exhaust to the pilot line 195 and accordingly the righthand end of the indexed cylinder 77 is connected to the air reserve 190 so that the piston rod 76 thereof is thrown rapidly to the left carrying the distributor 70 and the cam 86 to the left and thus indexing the distributor 70 to the left reel 16.

As the strand 11 is transferred from the full takeup reel 14 to the empty takeup reel 16 one of the fingers 57—57 of each of the rotating snagger wheels 27 and 28 will cooperate to catch a portion of the strand 11 and to carry it against the cutter 59 whereby the strand 11 is severed and the new leading end thereof is attached to the snagger 28 and wound on the winding drum 34 of an empty takeup reel 16. Thus, the reeling of the strand 11 commences with the winding drum of the empty takeup reel.

The solenoid 185 of the distributing valve 172 is deenergized at this time and the solenoid 186 of the valve 172 is energized through the closure and dwell of the contact 347 of the time delay relay 299. Accordingly, the distributor 70 commences its movement in the righthand direction and continues moving in that direction until the ball 87 strikes the actuator 91 of the limit switch 93 which indirectly controls the distributor 70 to reverse its movement. After a predetermined distance of travel of the distributor carriage 70 to the left, the contact 92 is closed due to the fact that the ball 87 strikes the actuator 89 of the limit switch 92, thus energizing the relay 298 which in turn results in the actuation of the valve 172 to reverse the movement of the distributor 70.

Now that the cutover operation is completed, the reeling operation on the takeup reel 16 proceeds in the normal manner, previously described. The takeup reel 14 is stopped subsequently by the inherent friction of the drive unit 47. The door 103 is opened by being moved to the left which is possible since the spring-biased latch 262 was retracted by the solenoid 259 when it was deenergized as a result of the contact 227 being opened. The filled reel 14 is then removed from the reel supporting centers 22 and 29 and is replaced by another empty takeup reel 14 and the door 103 is moved to the center position to close the contact 109 in preparation for subsequent energization of the takeup drive unit 47. Thereafter, when the takeup reel 16 is nearly full the drive unit 47 is again energized to rotate the empty takeup reel 14 as previously described. The apparatus is then in readiness for a cutover operation initiated as a result of the splice in the wire forming the strand 11 being pulled to open the switch 412 as previously described, resulting in a cutover from the left reel 16 to the right reel 14 which proceeds as previously described in the procedure for the initial cutover from the left reel 16 to the right reel 14 except that the cutover will be initiated by the switch 412 instead of the reset button 413 and the spark testing apparatus will not be effected by this cutover. The cycle comprising the counter-actuated cutovers and the splice-actuated cutovers may repeat indefinitely without stopping the machine.

It is understood that the above described arrangements are simply illustrative of the application of the principles of the invention. Numerous other arrangements may be readily devised by those skilled in the art which will embody the principles of the invention and fall within the spirit and scope thereof.

What is claimed is:

1. Apparatus for taking up an advancing strand upon rotatably driven takeup reels, which comprises a plurality of takeup reels, means for rotating a first of said reels for reeling the strand on said first reel, means for directing the strand back and forth across the winding surface of said first reel to distribute the strand on the winding surface of said first reel, means for rotating another of said reels when a predetermined length of strand has been wound on said first reel, means for directing the distribution of the strand toward the end of said first reel situated furthest from said other reel and for a length of travel equal to a fraction of the normal length of travel of the distribution of the strand material in that direction from whatever position the distribution of the strand is being directed when said predetermined length of strand has been wound upon said first reel, means for stopping the distribution of the strand momentarily prior to the transfer of said distributor from said first reel to said other reel, means for connecting a portion of the strand adjacent to said first reel operatively to said first reel, means for transferring the distribution of the strand from said first reel to said other reel when a second predetermined length of the strand has been wound upon said first reel, and means for connecting the strand operatively to said other reel for distributing the strand on the winding surface of said other reel.

2. Apparatus for reeling advancing strand upon rotatably driven takeup reels comprising a plurality of takeup reels, means for rotating a first of said reels, means for directing the strand back and forth upon the winding surface of said first reel for distributing the strand thereon for reeling the strand on said first reel, means for rotating a second of said reels, means for connecting a portion of the strand operatively to said first reel, means for reducing the speed of rotation of said first reel so as to develop slack in the strand to permit a transfer of the strand from said first reel to said second reel without introducing excessive stresses in the strand during such transfer, means for transferring the strand to said second reel, and means for connecting a portion of the strand operatively to said second reel.

3. Apparatus for taking up an advancing strand upon rotatably driven takeup reels, which comprises a plurality of takeup reels, means for rotating a first of said reels for reeling the strand on said first reel, means for directing the strand back and forth across the winding surface of said first reel to distribute the strand on said first reel, means for rotating a second of said reels, means for directing the distribution of the strand in a direction opposite to the direction of said second reel when a predetermined length of the strand has been wound on said first reel for a partial traverse of the reel equal to a predetermined fraction of the possible traverse of the distribution of the strand in that direction from whatever place the strand is being distributed when said predetermined length of strand has been wound upon said first reel, means for connecting a portion of the strand adjacent to said first reel operatively to said first reel, means for transferring the distribution of the strand from said first reel to said second reel when a second predetermined length of strand has been wound upon said first reel, means for connecting the strand operatively to said second reel, and means for distributing the strand on the winding surface of said second reel.

4. In a strand reeling apparatus for taking up an advancing strand upon rotatably driven takeup reels having a strand distributing means mounted for movement transversely of the winding surfaces of the takeup reels, means for indexing said strand distributing means from one operating station whereat the strand is distributed upon one takeup reel to another operating station whereat the strand is distributed similarly upon another takeup reel, and means connected operatively to each of said reels for gripping portions of the strand adjacent to each reel when the strand is indexed from one reel to the other, the improvement which comprises a cam means actuated by said indexing means, a plurality of limit switches positioned adjacent to said distributing means, a plurality of spaced spherical cam members alternately actuated by said cam means, each of the cam members being utilized for alternately actuating separate pairs of said limit switches for controlling said distributing means as said distributing means is traversing the winding surfaces of different reels, and means for operating said indexing means when a predetermined length of strand has been wound upon a filled reel to index the strand from the filled reel to an empty reel and move said cam means from a first of said cam members to actuate a second of said spherical cam members which in turn alternately actuates a respective pair of said limit switches for controlling said distributing means for distributing the strand on the winding surface of the empty takeup reel.

5. In a strand reeling apparatus for taking up an advancing strand upon rotatably driven takeup reels having a strand distributing means mounted for movement transversely of the winding surfaces of the takeup reels, means for indexing said strand distributing means from one operating station whereat the strand is distributed upon one takeup reel to another operating station wherein the strand is distributed similarly upon another takeup reel, means connected operatively to each of said reels for gripping portions of the strand adjacent to each reel when the strand is indexed from one reel to the other, and means for supplying the strand, the improvement which comprises a movable strand guide for directing the strand from the strand supply means to the distributing means and means for moving the strand guide at a predetermined time for creating slack in the strand to permit the indexing of the strand and the distributing means from one reel to the other to take place without introducing excessive stress in the strand.

6. In a strand reeling apparatus for taking up an advancing strand upon rotatably driven takeup reels having a strand distributing means mounted for movement transversely of the winding surfaces of the takeup reels, means for indexing said strand distributing means from one operating station whereat the strand is distributed upon one takeup reel to another operating station whereat the strand is distributed similarly upon another takeup reel, and means connected operatively to each of said reels for gripping portions of the strand adjacent to each reel when the strand is transferred from one reel to the other, the improvement which comprises a drive unit comprising an electrical motor associated with each of said reels for rotating the same, and means for causing the motor of the drive unit associated with a filled reel from which the strand is to be transferred to be deenergized and allowed to coast and slow said filled reel down as a result of the inherent friction in said drive unit thereby causing slack to accumulate in an amount necessary for the transfer of the strand and said distributing means from the filled reel to an empty reel without introducing excessive stress in the strand when the strand is directed to the empty reel by the distributing means.

7. In a strand reeling apparatus for taking up an advancing strand upon rotatably driven takeup reels having a strand distributing means mounted for movement transversely of the winding surfaces of the takeup reels, means for indexing said strand distributing means from one operating station whereat the strand is distributed upon one takeup reel to another operating station whereat the strand is distributed similarly upon another takeup reel, and snagging means connected operatively to each of said reels for gripping portions of the strand adjacent to each reel when the strand is transferred from one reel to another, the improvement which comprises guide means positioned adjacent to said snagging means and having a portion extending outwardly beyond the substantially circular paths defined by the movement of the snagging means and positioned in the direct transverse path of travel of successive portions of the strand extending past and in engagement with the distributing means to the one takeup reel during the indexing of the distributing means, said guide means being designed to divert said last-mentioned portions of the strand outwardly from the snagging means as the strand distributing means is indexed from the one reel to the other reel so as to delay the gripping of the strand by said snagging means.

8. In a strand reeling apparatus for taking up an advancing strand upon rotatably driven takeup reels having a strand distributing means mounted for movement transversely of the winding surfaces of the takeup reels, means to index said strand distributing means from one operating station whereat the strand is distributed upon one takeup reel to another operating station whereat the strand is distributed similarly upon another takeup reel, and means connected operatively to each of said reels for gripping portions of the strand adjacent to each reel when the strand is transferred from one reel to another, the improvement which comprises a plurality of limit switches positioned adjacent to said distributing means, a plurality of spaced spherical cam members each for alternating actuating separate pairs of said limit switches for controlling said distributing means as said distributing means is traversing the winding surfaces of different reels, and an actuating means controlled by said indexing means for alternately actuating said cam members, only one of said cam members being operative at one time to actuate only the limit switches associated with the particular reel onto which the strand is being distributed by the distributing means at that time.

9. In a strand reeling apparatus for taking up an advancing strand upon rotatably driven takeup reels having a strand distributing means mounted for movement transversely of the winding surfaces of the takeup reels, means to index said strand distributing means from one operating station whereat the strand is distributed upon a first takeup reel to a second operating station whereat the strand is distributed similarly upon a second takeup reel, and means connected operatively to each of said reels for gripping portion of the strand adjacent to each reel when the strand is transferred from one reel to the other, the improvement which comprises a memory circuit comprising a plurality of capacitors which are connected normally in parallel and so controlled that as the distributor is travelling in a direction toward the reel opposite to that at which the distributor is stationed the capacitors will be charging and as the distributor is travelling in a direction away from the opposite reel the capacitors will be discharging, the charge on at least one of the capacitors at any instant being a gauge of the amount of the normal travel of the distributor that has been traversed at that instant.

10. In a strand reeling apparatus for taking up an advancing strand upon rotatably driven takeup reels having a strand distributing means mounted for movement transversely of the winding surfaces of the takeup reels, means to index said strand distributing means from one operating station whereas the strand is distributed upon one takeup reel to another operating station whereat the strand is distributed similarly upon another takeup reel, and means connected operatively to each of said reels for gripping portions of the strand adjacent to each reel when the strand is transferred from one reel to the other, the improvement which comprises a memory circuit comprising a plurality of capacitors which are normally connected in parallel and so controlled that as the distributor is travelling toward the reel opposite to that at which the distributor is stationed the capacitors will be charging and as the distributor is travelling in a direction away from the opposite reel the capacitors will be discharging, distributor directing means responsive to the charge on at least one of the capacitors to control the direction of travel of the distributor, and means to remove one or more of said capacitors from said memory circuit for causing the distributor directing means to control the direction of travel of the distributor so that the distance of travel of the distributor in a direction away from the opposite reel will be a fraction of the normal travel of the distributor in that direction.

11. Strand reeling apparatus for taking up an advancing strand upon rotatably driven takeup reels, which comprises a strand distributing means mounted for movement transversely of said takeup reels, indexing means operatively connected to said distributing means for indexing said strand distributing means from one operating position whereat the strand is distributed upon one takeup reel to another operating position whereat said strand is distributed similarly upon another takeup reel, means for slowing down one of the takeup reels to create slack in said strand when the distributing means is indexed from one operating position to another, and a rotating sheave for guiding said strand to said strand distributing means having annular shrouds on opposing sides thereof secured to stationary plates on opposing sides of said sheave which project beyond said sheave for permitting the strand to become slack as a result of the slowing down of the reel from which the distributing means is being indexed without the strand leaving said sheave, whereby the necessity of providing an accumulator to eliminate slack in the strand prior to and during the cutover operation is eliminated.

12. Strand reeling apparatus for taking up an advancing strand on rotatably driven takeup reels comprising means for rotating said takeup reels, a strand distributing means for guiding the strand transversely of the winding surfaces of the takeup reels, means for indexing the strand and said strand distributing means from one position whereat the strand is distributed on one reel to another position whereat the strand is distributed on another takeup reel, means for supplying the strand, a strand guide for directing the strand from the strand supply means to the distributing means, means connected operatively to each of said reels for gripping portions of the strand adjacent to each reel when the strand is indexed from one reel to the other reel, guide means positioned adjacent to said gripping means for directing the strand toward said gripping means at a desired portion of a time interval in which the strand is indexed from one reel to another, a memory circuit operated in accordance with the position of the distributing means at any instant, means for protecting a portion of said memory circuit against the presence of excessive voltage, a plurality of limit switches positioned adjacent to said distributing means, a plurality of cam members each for selectively actuating separate pairs of said limit switches for controlling said distributing means, and an actuating means controlled by said indexing means for sequentially actuating said cam members.

13. In a strand reeling apparatus for taking up an advancing strand upon rotatably driven takeup reels having a strand distributing means mounted for guiding the strand transversely of the winding surfaces of the takeup reels, and means for indexing said strand from one takeup reel to another takeup reel, the improvement which comprises a memory circuit including condensers charged and discharged in accordance with the position and direction the distributing means is guiding the strand at any instant of the coiling operation for controlling the distributing means and thus the direction and length of travel of the strand distributing means in each direction during a predetermined portion of the operating cycle of the strand reeling apparatus.

14. In a strand reeling apparatus for taking up an advancing strand upon rotatably driven takeup reels having a strand distributing means mounted for guiding the strand transversely of the winding surfaces of the takeup reels, and means for indexing said strand from one takeup reel to another takeup reel, the improvement which comprises a memory circuit operated in accordance with the position the distributing means guides the strand at any instant, and means for protecting a portion of said memory circuit against the presence of excessive voltage, which comprises at least one rectifier connected in parallel with the portion to be protected whereby the forward conduction of said at least one rectifier chokes off any damaging increase in voltage.

15. In a strand reeling apparatus for taking up an advancing strand upon rotatably driven takeup reels having a strand distributing means mounted for guiding the strand transversely of the winding surface of the takeup reels, and means for indexing said strand distributing means from one takeup reel to another takeup reel, the improvement which comprises a memory circuit including means for storing electrical energy in an amount proportional to the distance the distributor is positioned at any instant from a predetermined end of the takeup reel on which the strand is being distributed when the distributing means is travelling away from the predetermined end of the reel and for discharging the stored electrical energy at a rate proportional to the rate of travel of the distributing means toward the predetermined end of the takeup reel on which the strand is being distributed, said memory circuit being operable in accordance with the position to which the distributing means is guiding the strand and the direction in which the distributing means is traveling at any instant of the coiling operation for controlling the direction of travel of the distributing means and length of travel of the distributing means in each direction during predetermined portions of the operating cycle of the strand reeling apparatus.

References Cited in the file of this patent

UNITED STATES PATENTS

| | | |
|---|---|---|
| 1,393,286 | Hosford | Oct. 11, 1921 |
| 1,685,161 | Honaman | Sept. 25, 1928 |
| 1,929,570 | Taylor | Oct. 10, 1933 |
| 2,584,800 | Grisdale | Feb. 5, 1952 |
| 2,779,545 | Hauck et al. | Jan. 29, 1957 |

UNITED STATES PATENT OFFICE
CERTIFICATION OF CORRECTION

Patent No. 2,971,710                         February 14, 1961

Tillman Tenney Bunch

It is hereby certified that error appears in the above numbered patent requiring correction and that the said Letters Patent should read as corrected below.

Column 15, line 52, for "243-243" read -- 234-234 --; line 68, for "reuslt" read -- result --; column 17, line 24, for "258" read -- 358 --; column 20, line 69, for "he" read -- the --; column 22, line 72, for "invention" read -- inventions --; column 25, line 46, for "portion" read -- portions --; line 64, for "whereas" read -- whereat --.

Signed and sealed this 8th day of August 1961.

(SEAL)
Attest:

ERNEST W. SWIDER
Attesting Officer

DAVID L. LADD
Commissioner of Patents